US012722168B2

(12) United States Patent
Zama et al.

(10) Patent No.: US 12,722,168 B2
(45) Date of Patent: Sep. 1, 2026

(54) BACKPACK WORKING MACHINE

(71) Applicant: Makita Corporation, Anjo (JP)

(72) Inventors: Ryoji Zama, Anjo (JP); Yuki Koide, Anjo (JP)

(73) Assignee: MAKITA CORPORATION, Anjo (JP)

( * ) Notice: Subject to any disclaimer, the term of this patent is extended or adjusted under 35 U.S.C. 154(b) by 334 days.

(21) Appl. No.: 18/335,386

(22) Filed: Jun. 15, 2023

(65) Prior Publication Data

US 2023/0405622 A1 Dec. 21, 2023

(30) Foreign Application Priority Data

Jun. 20, 2022 (JP) ................................ 2022-099093

(51) Int. Cl.
*B05B 7/24* (2006.01)

(52) U.S. Cl.
CPC .................................. *B05B 7/2475* (2013.01)

(58) Field of Classification Search
CPC ........ B05B 7/2475; B05B 7/1427; B05B 9/08
USPC .................................................. 239/152, 153
See application file for complete search history.

(56) References Cited

U.S. PATENT DOCUMENTS 7,007,826 B2 * 3/2006 Shapanus .............. B05B 9/0861 239/152
2014/0209705 A1 * 7/2014 Bahr ..................... B05B 7/1418 239/152
2016/0198636 A1 * 7/2016 Poole ..................... A01G 20/47 15/327.5
2018/0094393 A1 4/2018 Takahashi et al.
2019/0021243 A1 * 1/2019 Naka ...................... A01G 20/47
2023/0158523 A1 * 5/2023 Nakamoto ............ B05B 7/2416 239/351

FOREIGN PATENT DOCUMENTS

CN 208512836 U 2/2019
JP 2014-147356 A 8/2014
WO 2016/171031 A1 10/2016

OTHER PUBLICATIONS

Geoff, "The Definitive Guide that You Never Wanted: Packing Your Backpack", Pangolins with Packs, Oct. 29, 2020 (Year: 2020).*
Communication dated Mar. 3, 2026, issued in Japanese Application No. 2022-099093.

* cited by examiner

*Primary Examiner* — Cody J Lieuwen
(74) *Attorney, Agent, or Firm* — Sughrue Mion, PLLC

(57) ABSTRACT

A backpack working machine may be configured to eject liquid. The backpack working machine may include: a body unit; and a shoulder harness unit attached to the body unit and configured to be worn on shoulders of a user. The body unit may include: a battery unit comprising a battery attaching part to which a battery is attached; a fan unit comprising a fan configured to operate on electrical power of the battery; and a liquid tank configured to store the liquid. When the backpack working machine is placed on a placement surface, a direction perpendicular to the placement surface may be defined as an up-down direction. When the backpack working machine placed on the placement surface is viewed from above, 50% or more of the battery unit, 50% or more of the fan unit, and 50% or more of the liquid tank may overlap each other.

7 Claims, 28 Drawing Sheets

BACKPACK WORKING MACHINE

REFERENCE TO RELATED APPLICATIONS

This application claims priority to Japanese Patent Application No. 2022-099093, filed on Jun. 20, 2022, the entire contents of which are hereby incorporated by reference into the present application.

TECHNICAL FIELD

The disclosure herewith relates to a backpack working machine.

BACKGROUND ART

Chinese Utility Model Registration No. 208512836 describes a backpack working machine which ejects liquid. The backpack working machine includes a body unit and a shoulder harness unit attached to the body unit and configured to be worn on shoulders of a user. The body unit includes a battery unit with a battery attaching part to which a battery is attached, a fan unit comprising a fan which operates on electrical power of the battery, and a liquid tank which stores the liquid. The liquid tank is disposed above the battery unit. The fan unit is disposed above the battery unit and rearward of the liquid tank.

DESCRIPTION

In the above backpack working machine, when an amount of the liquid stored in the liquid tank decreases as the backpack working machine is used to work, a gravity center position of the body unit moves in a direction separating away from the user's back on which the backpack working machine is worn. This makes it difficult for a user to use the working machine. The disclosure herein provides art for suppressing a working machine from becoming difficult to use for a user.

A backpack working machine disclosed herein may be configured to eject liquid. The backpack working machine may comprise: a body unit; and a shoulder harness unit attached to the body unit and configured to be worn on shoulders of a user. The body unit may comprise: a battery unit comprising a battery attaching part to which a battery is attached; a fan unit comprising a fan configured to operate on electrical power of the battery; and a liquid tank configured to store the liquid. When the backpack working machine is placed on a placement surface, a direction perpendicular to the placement surface may be defined as an up-down direction. When the backpack working machine placed on the placement surface is viewed from above, 50% or more of the battery unit, 50% or more of the fan unit, and 50% or more of the liquid tank may overlap each other.

According to the above configuration, even when the amount of the liquid stored in the liquid tank decreases as the backpack working machine is used to work, the gravity center position of the body unit tends not to move in the direction separating away from the user's back wearing the backpack working machine. Due to this, the working machine can be suppressed from becoming difficult to use for a user.

FIG. 1 is a perspective view of a working machine 2 of an embodiment.

FIG. 2 is a right side view of the working machine 2 of the embodiment with an ejection tube 10 detached from a body unit 4.

Figure 11:
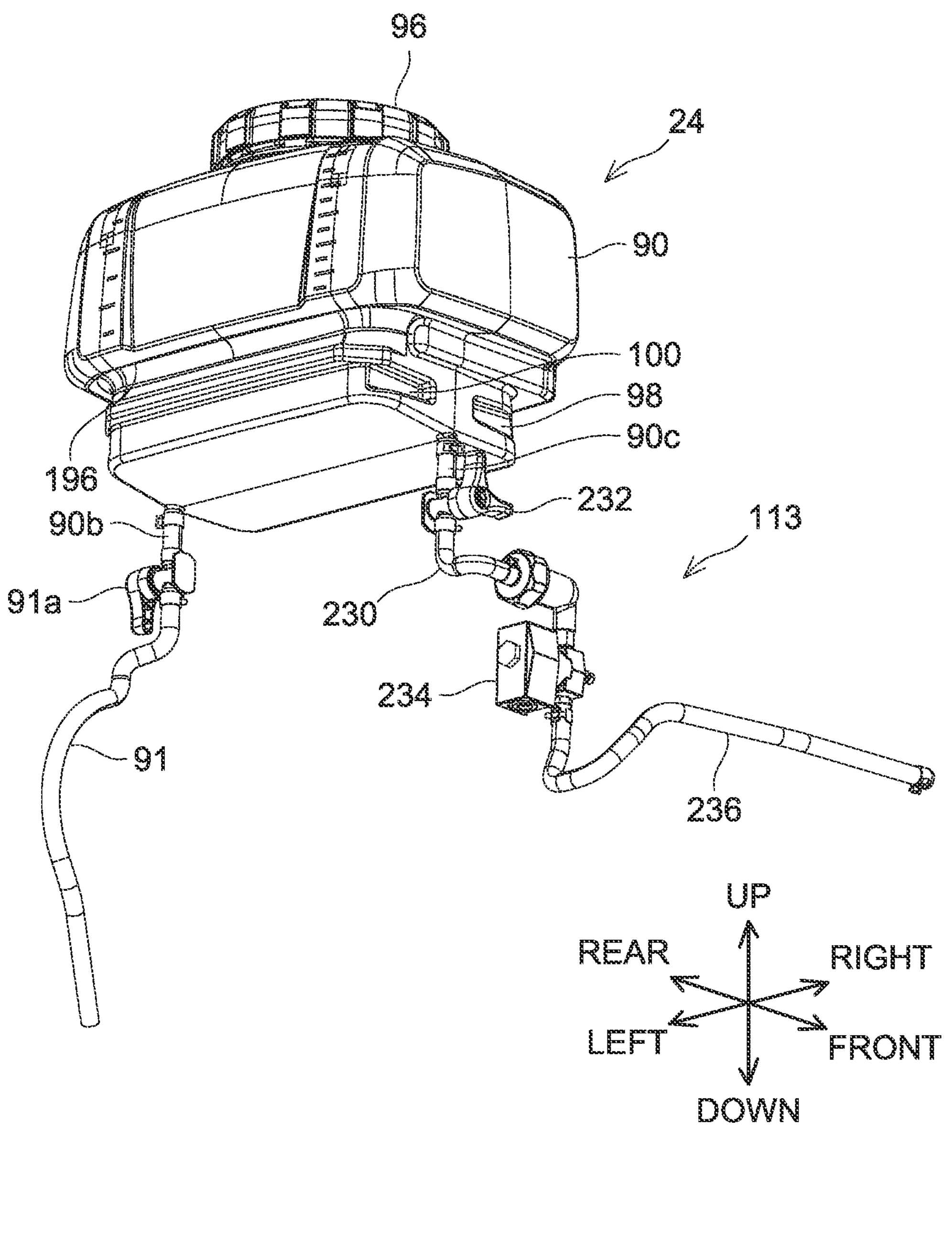

FIG. 11 is a perspective view of the liquid tank 24, a discharge tube 91, and a supply line 113 of the embodiment.

Figure 12:
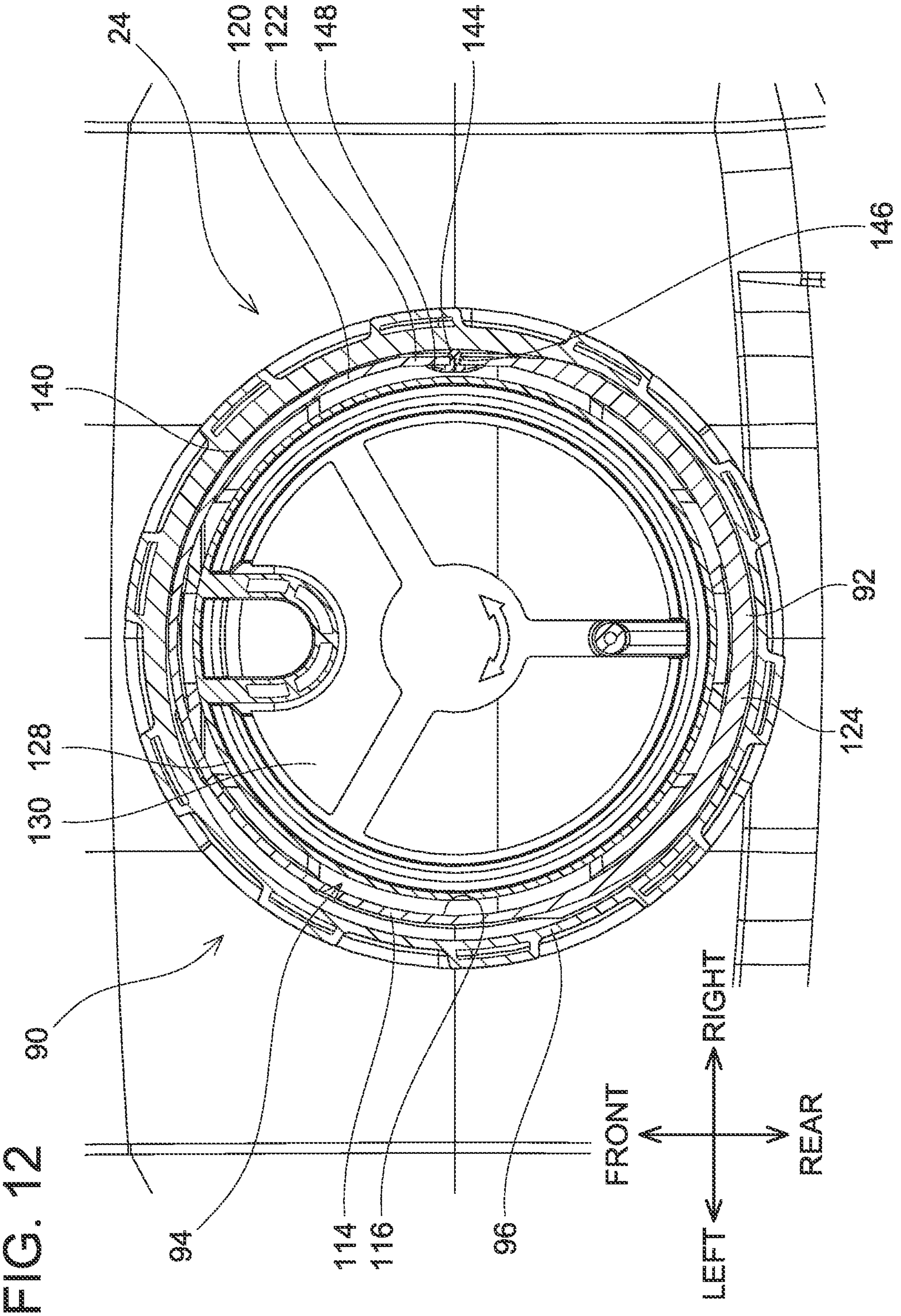

FIG. 12 is a horizontal cross-sectional view of a projection 92 of the liquid tank 24 of the embodiment and its vicinity.

Figure 13:
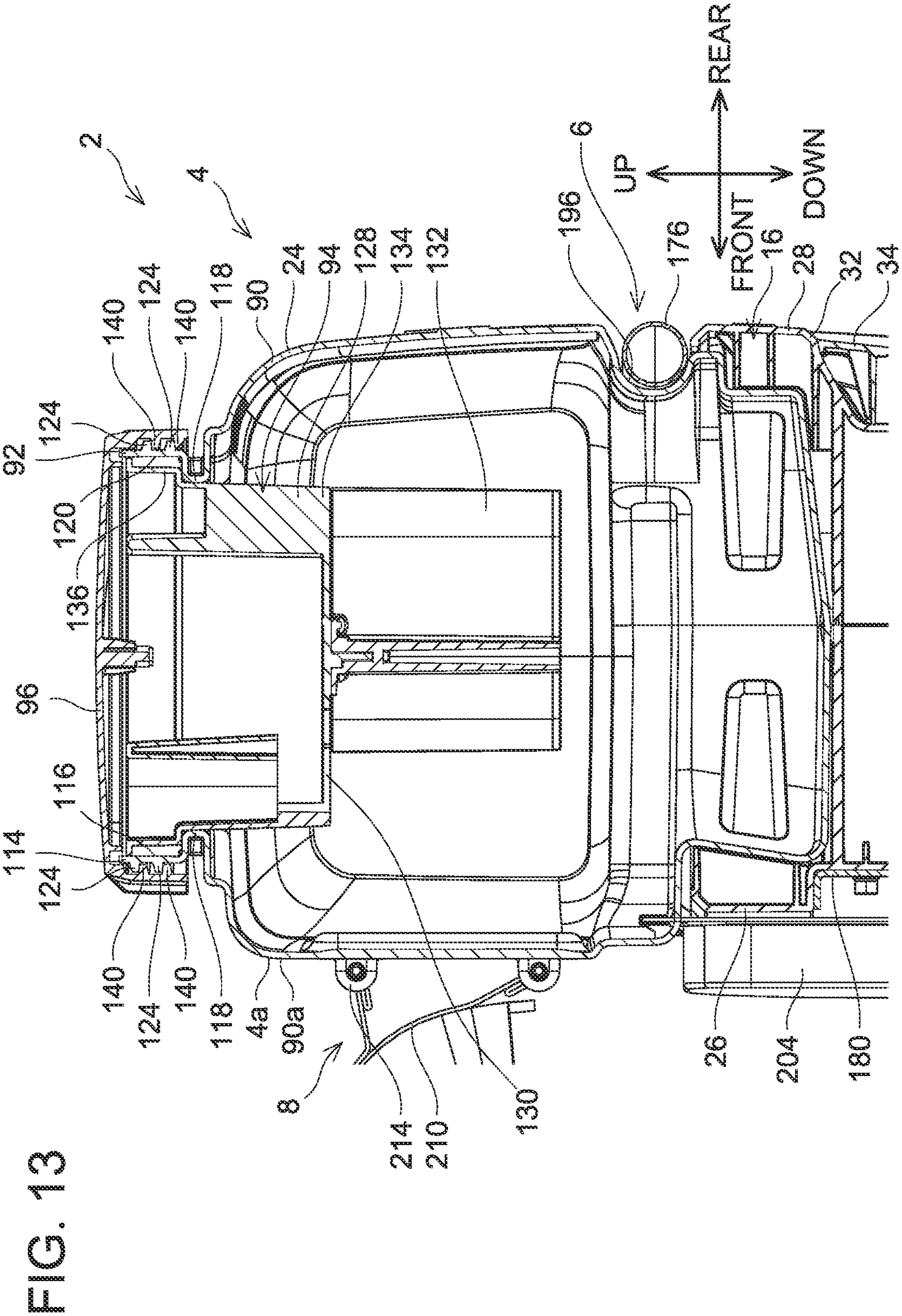

FIG. 13 is a vertical cross-sectional view of the working machine 2 of the embodiment.

Figure 14:
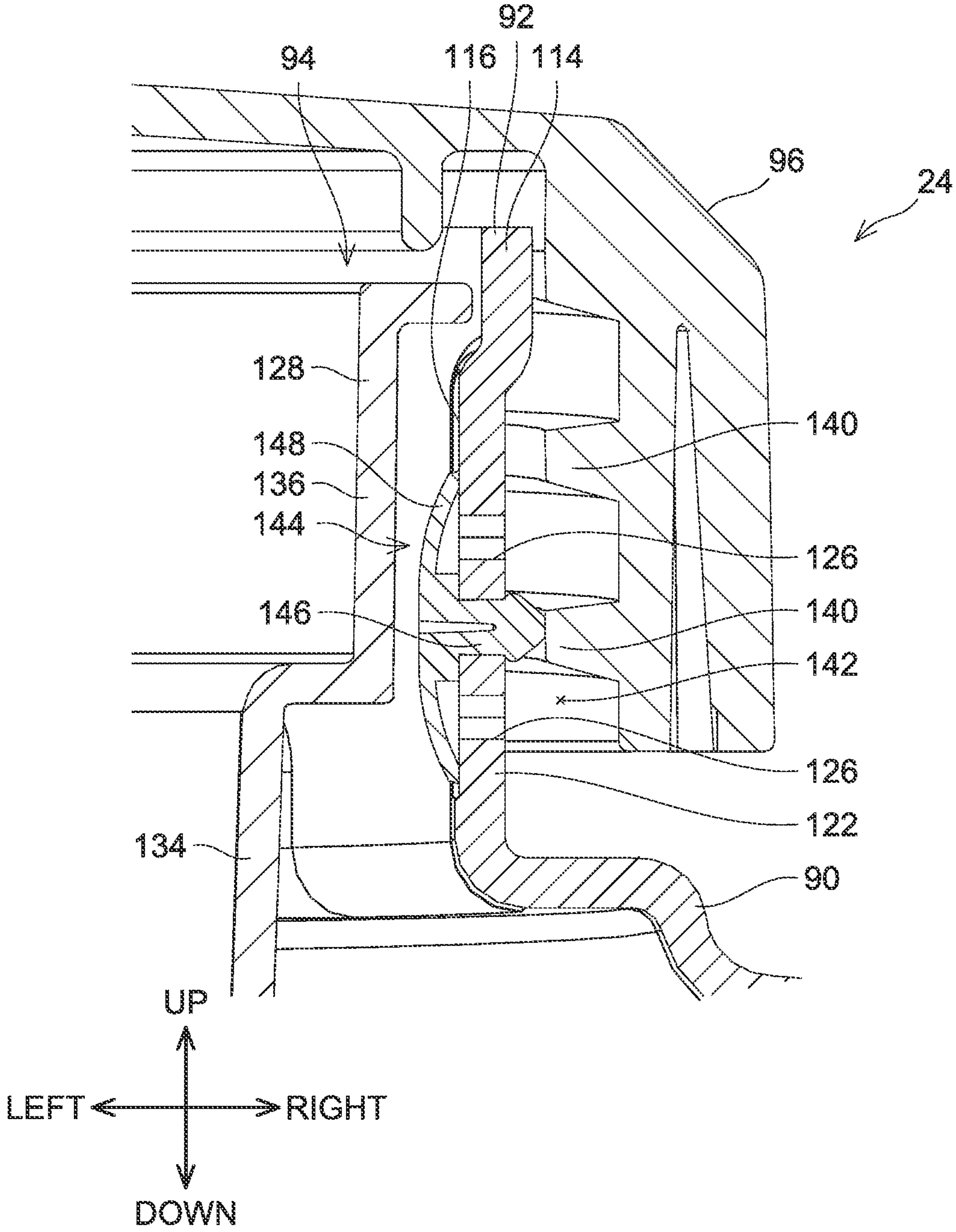

FIG. 14 is an enlarged cross-sectional view of the liquid tank 24 of the embodiment with a check valve 144 closed.

Figure 15:
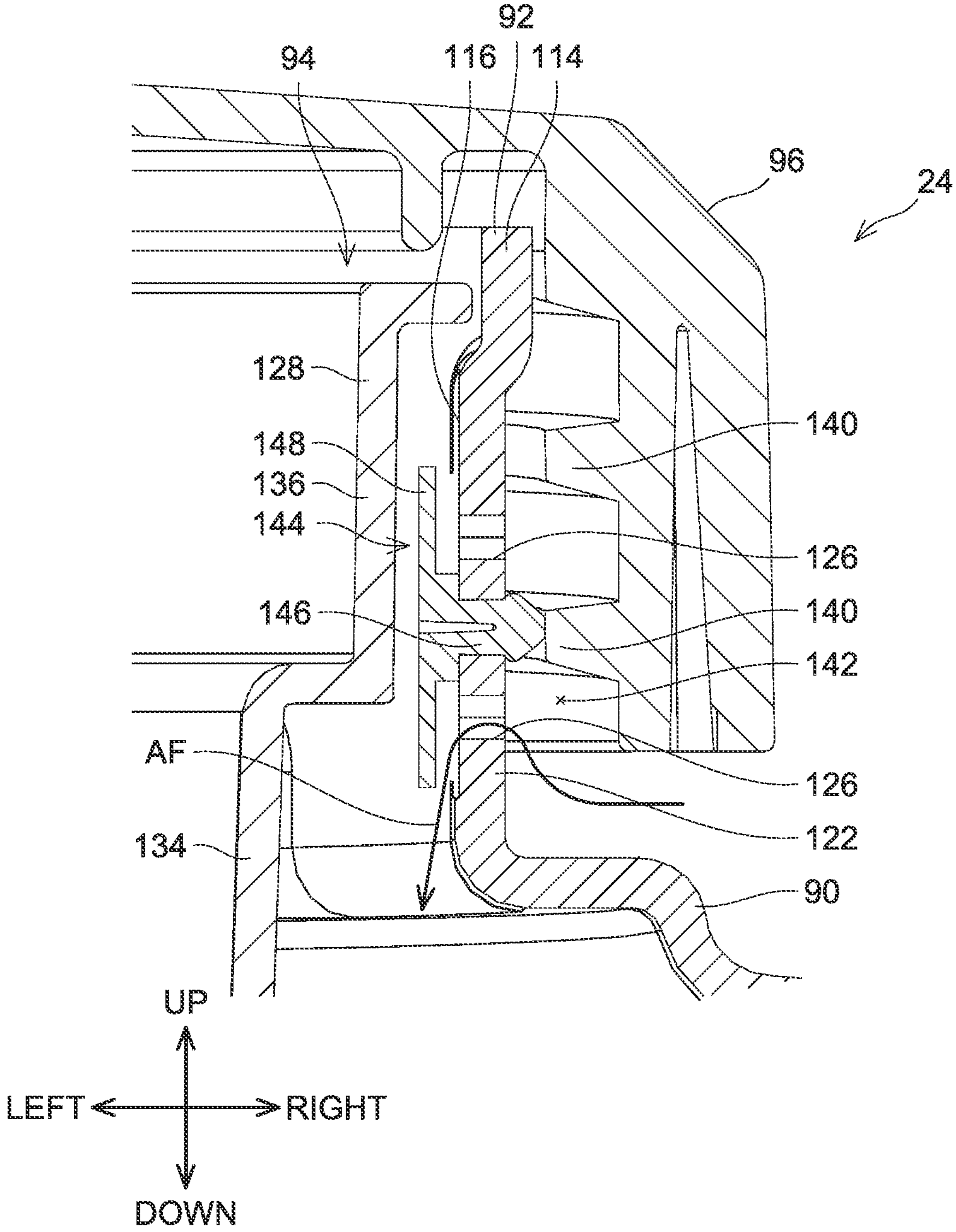

FIG. 15 is an enlarged cross-sectional view of the liquid tank 24 of the embodiment with the check valve 144 opened.

Figure 16:
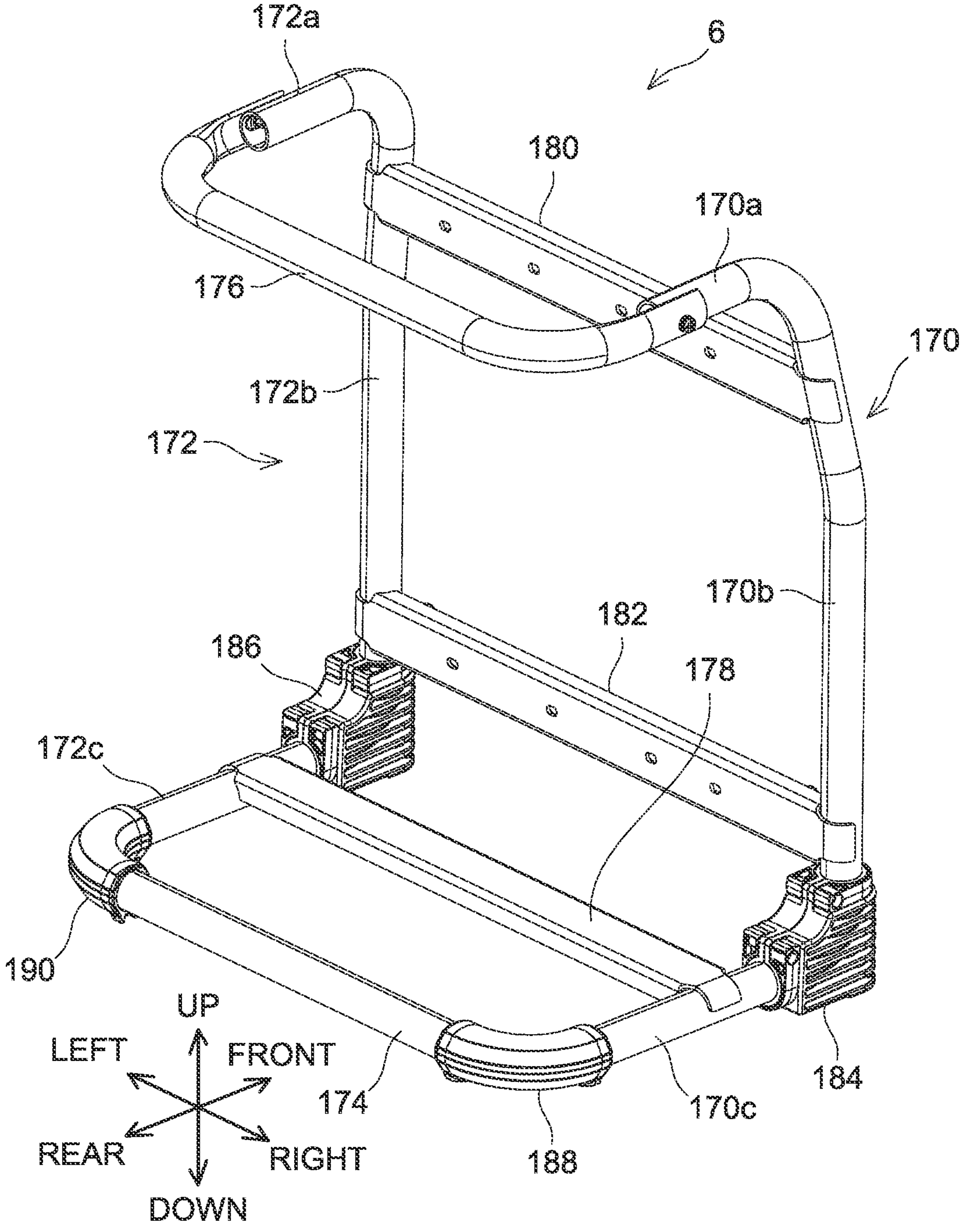

FIG. 16 is a perspective view of a frame unit 6 of the embodiment.

Figure 17:
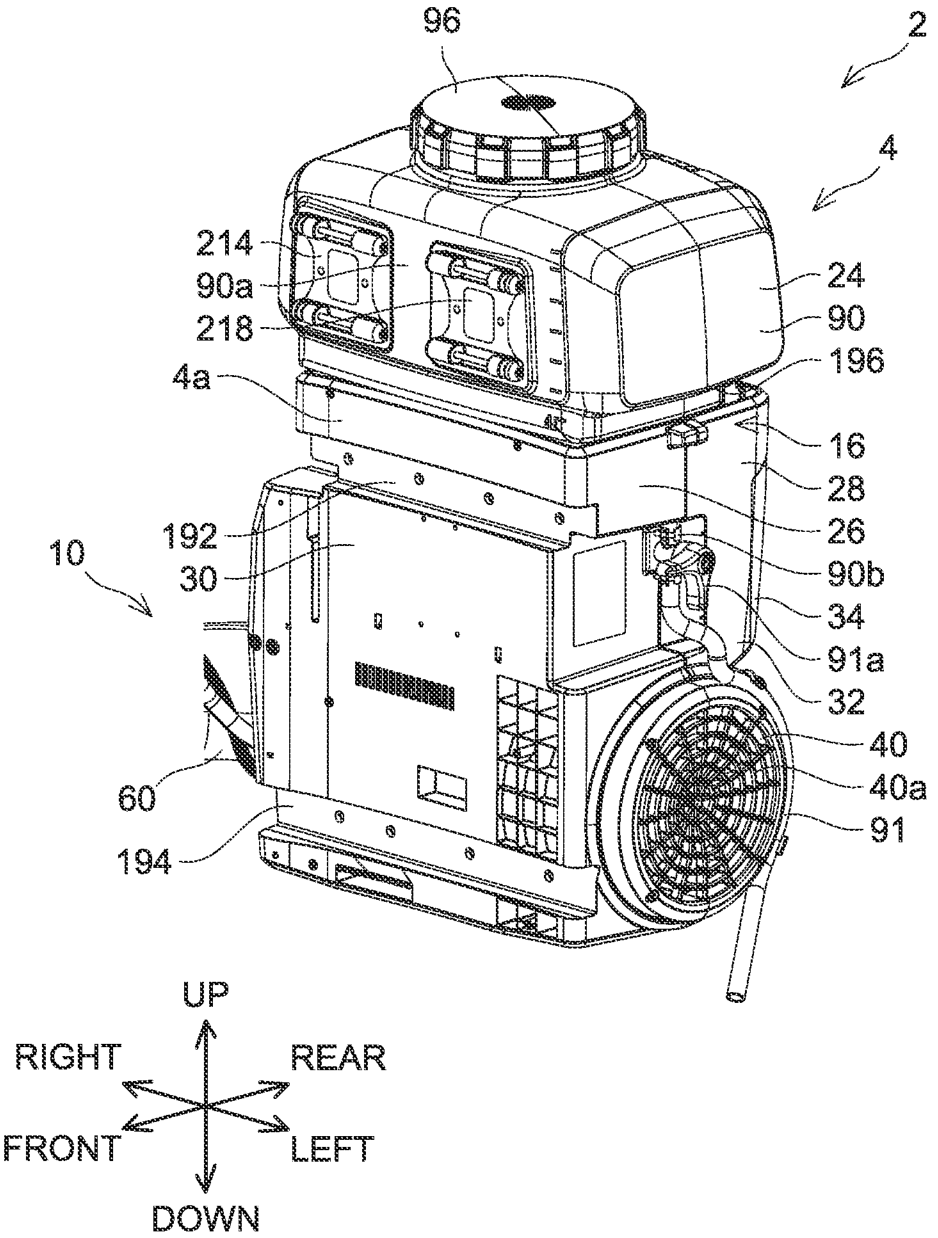

FIG. 17 is a perspective view of the working machine 2 of the embodiment with the frame unit 6 and a harness unit 8 detached from a body housing 16.

Figure 18:
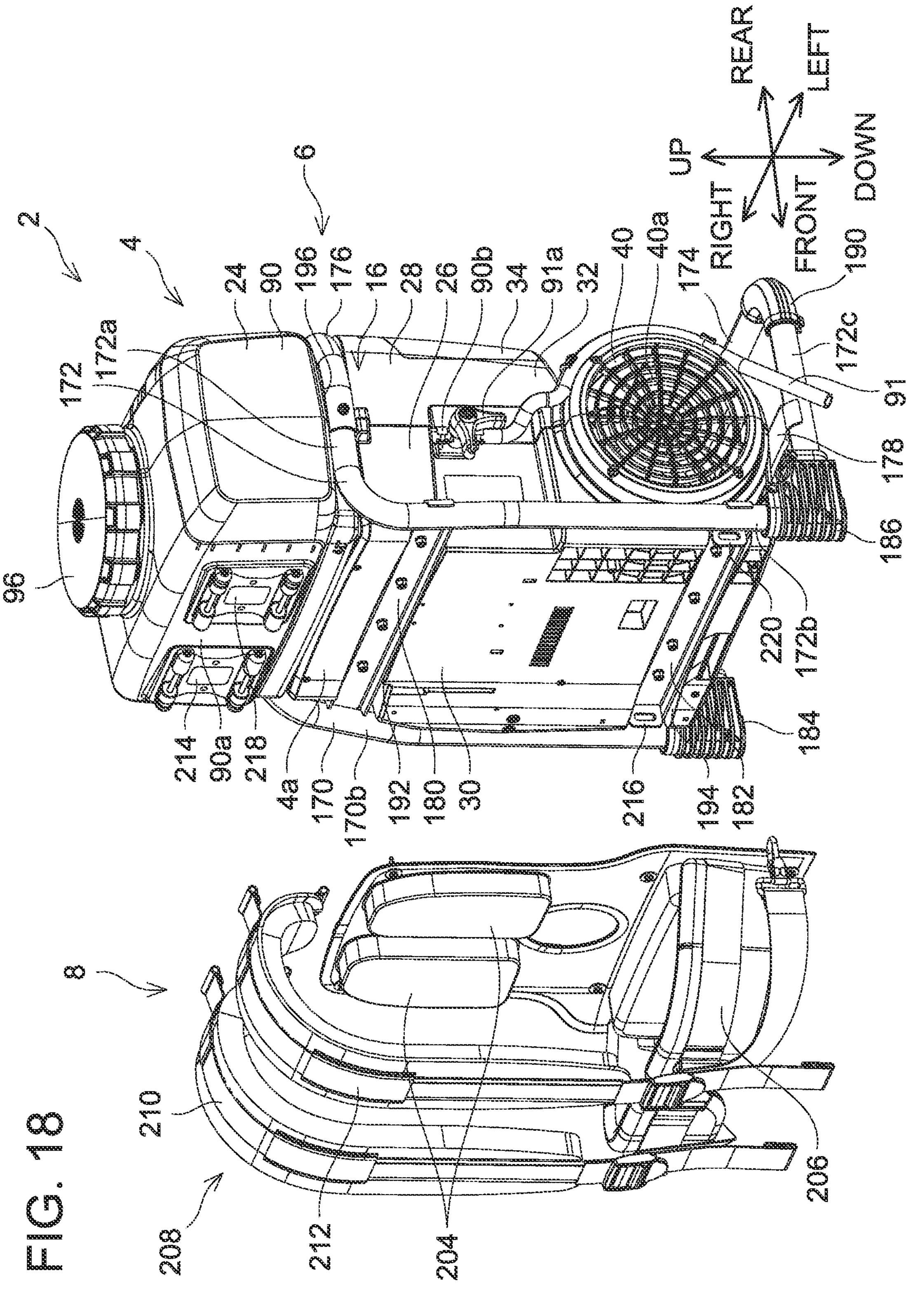

FIG. 18 is a disassembled perspective view of the working machine 2 of the embodiment with the ejection tube 10 detached from the body unit 4.

Figure 19:
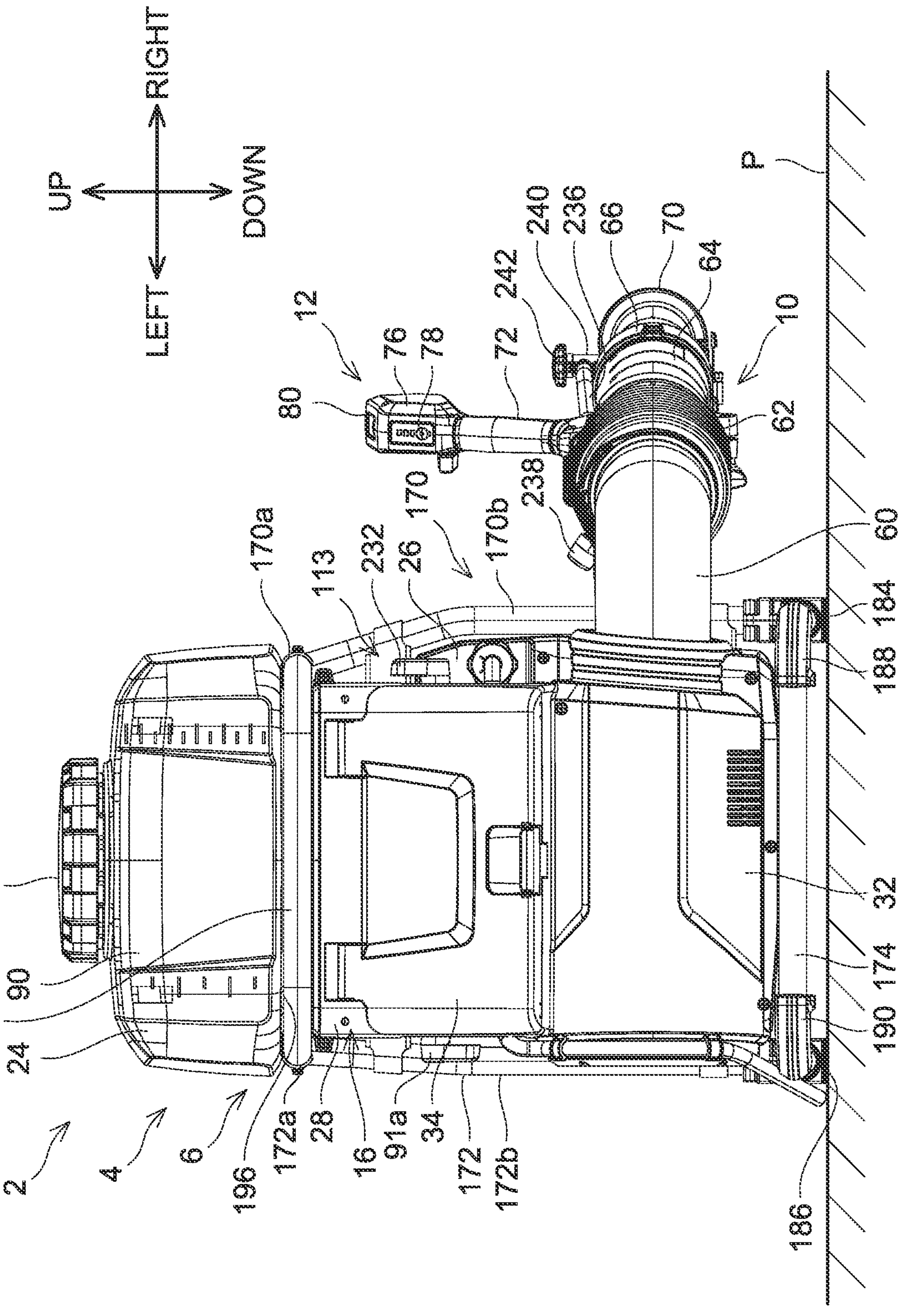

FIG. 19 is a rear view of the working machine 2 of the embodiment.

Figure 20:
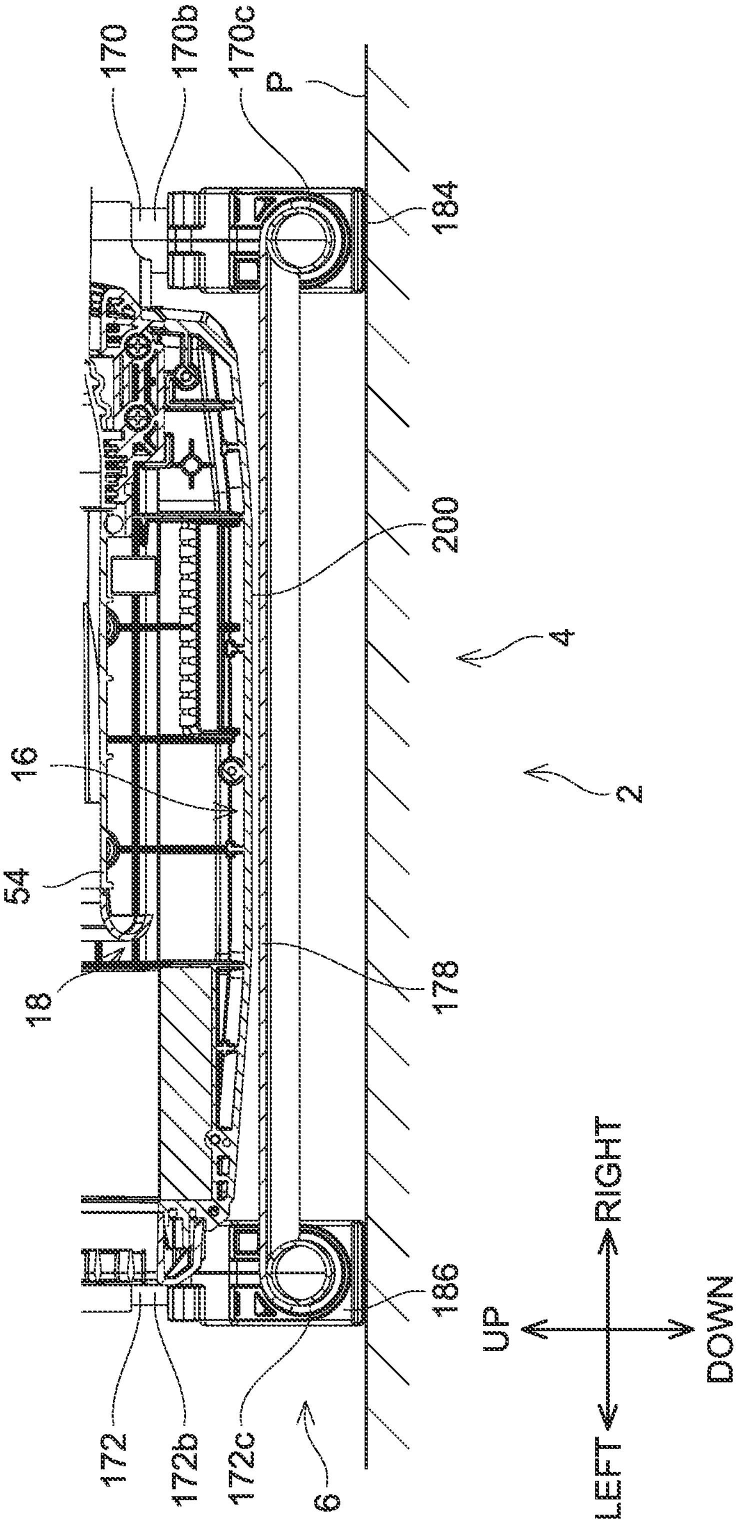

FIG. 20 is a vertical cross-sectional view of a lower facing surface 200 of the working machine 2 of the embodiment and its vicinity.

Figure 21:
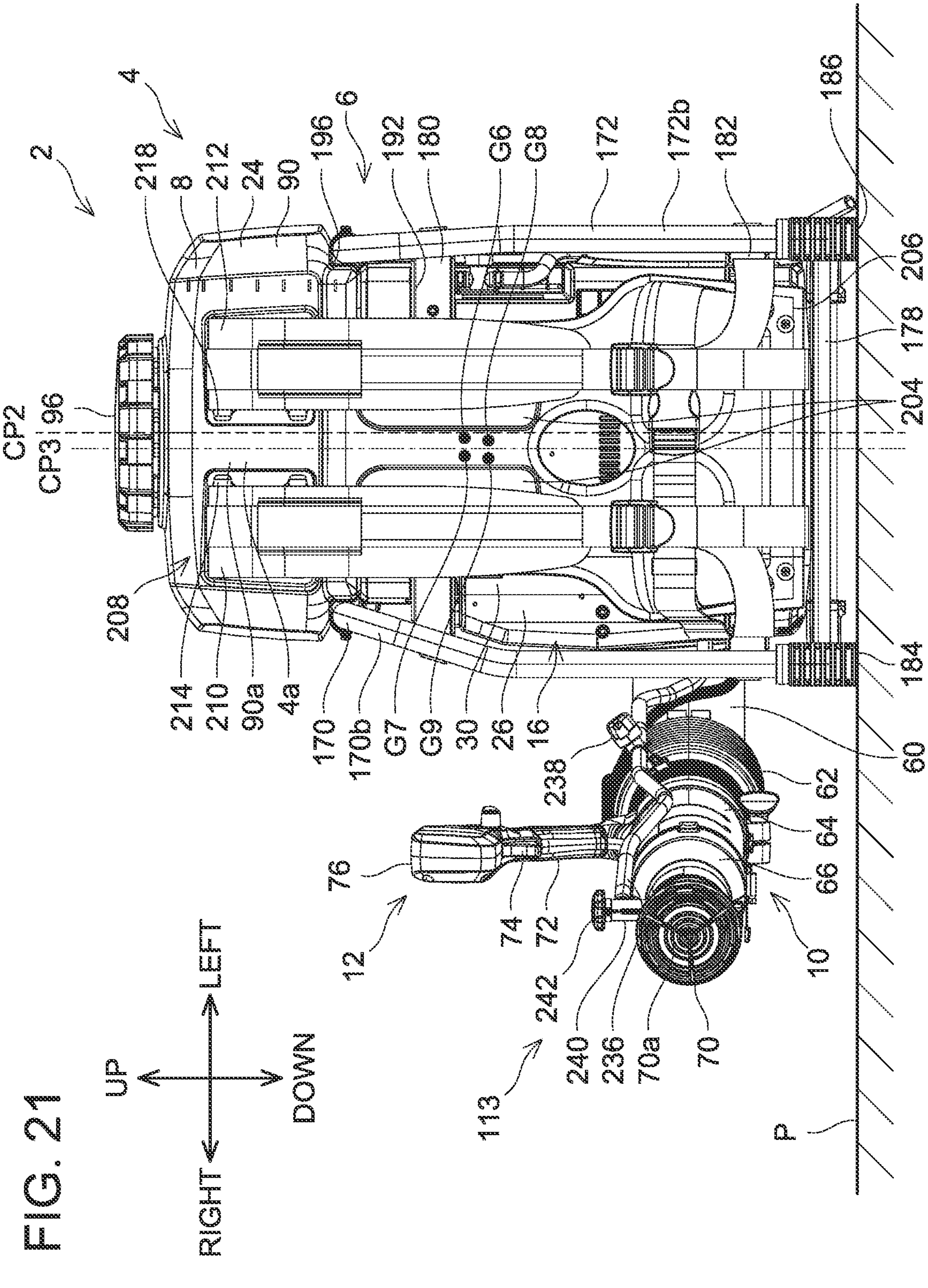

FIG. 21 is a front view of the working machine 2 of the embodiment.

Figure 22:
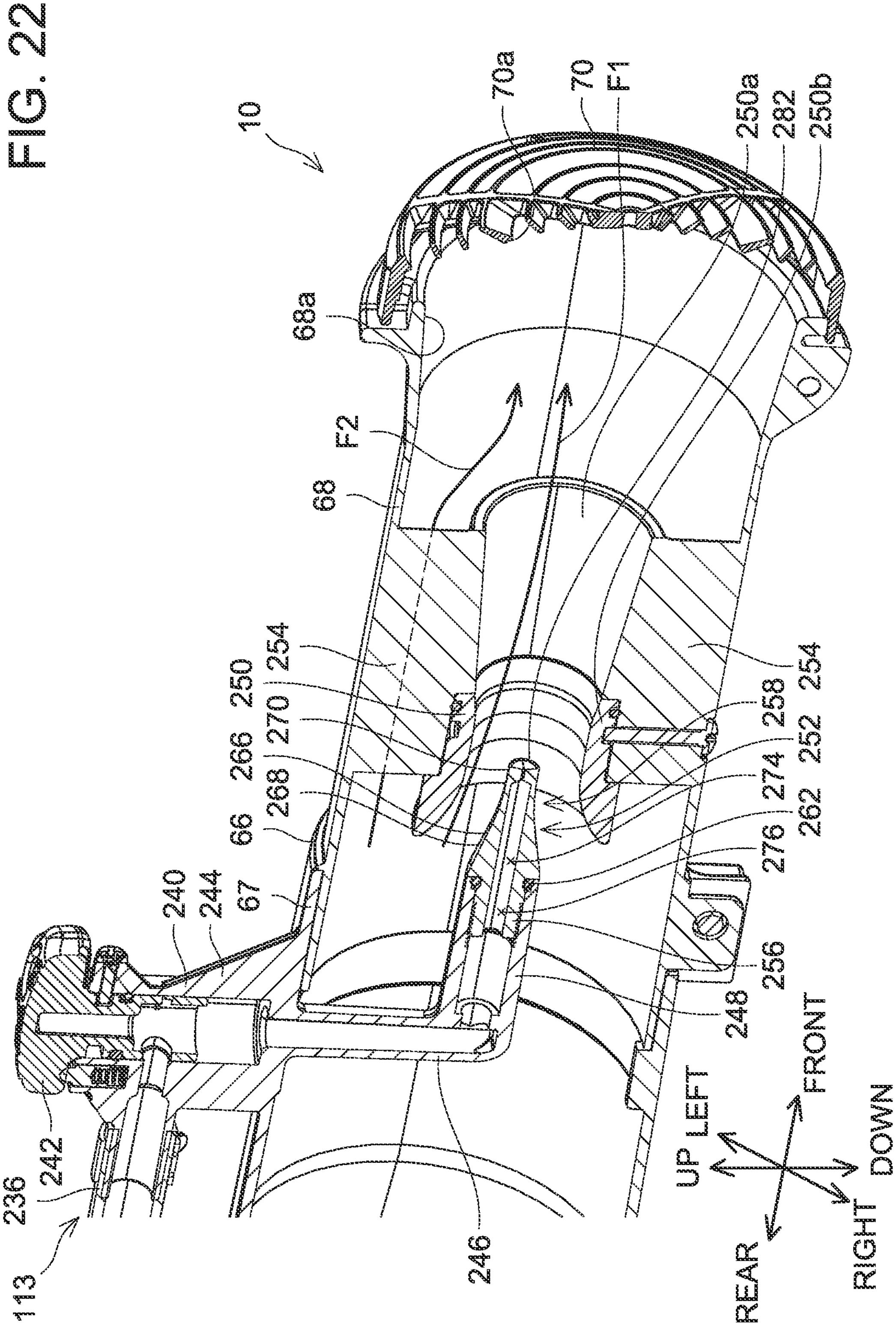

FIG. 22 is a cross-sectional perspective view of the ejection tube 10, a tubular member 250, and a liquid nozzle 252 of the embodiment.

Figure 23:
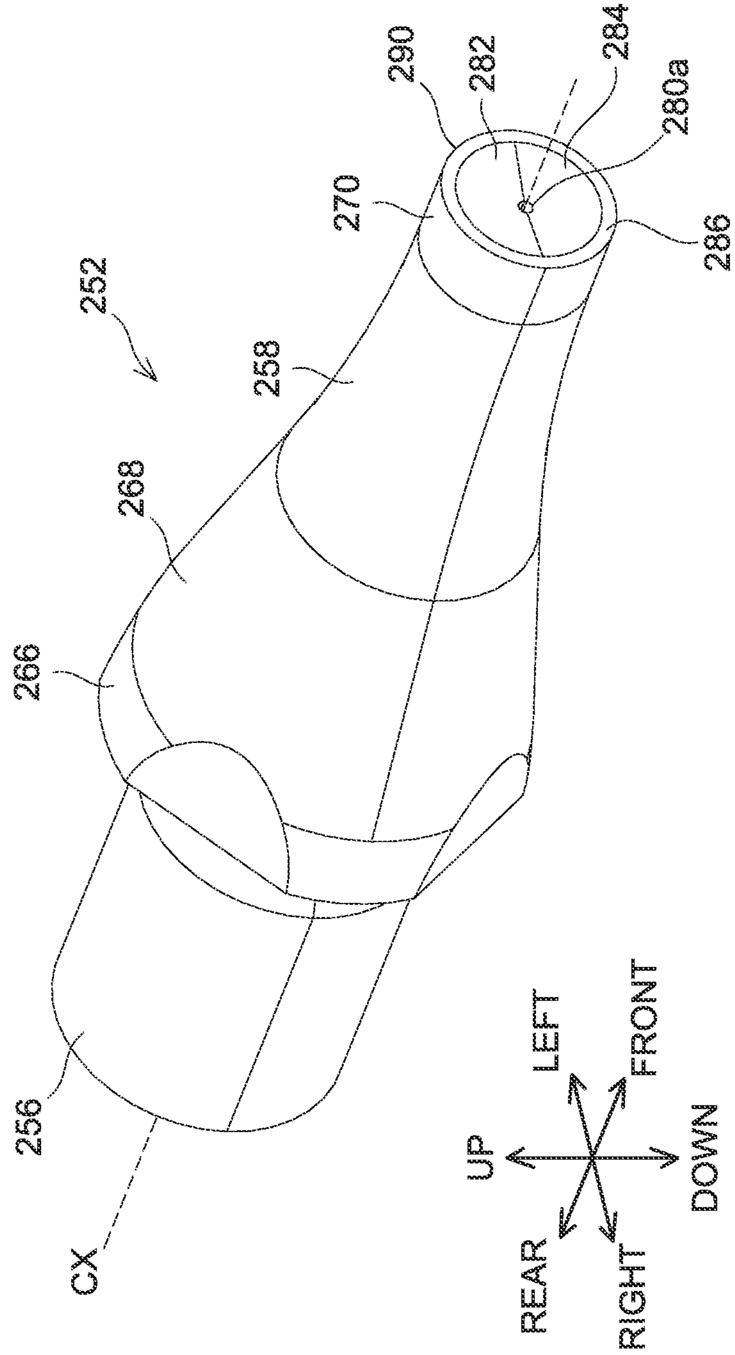

FIG. 23 is a perspective view of the liquid nozzle 252 of the embodiment.

Figure 24:
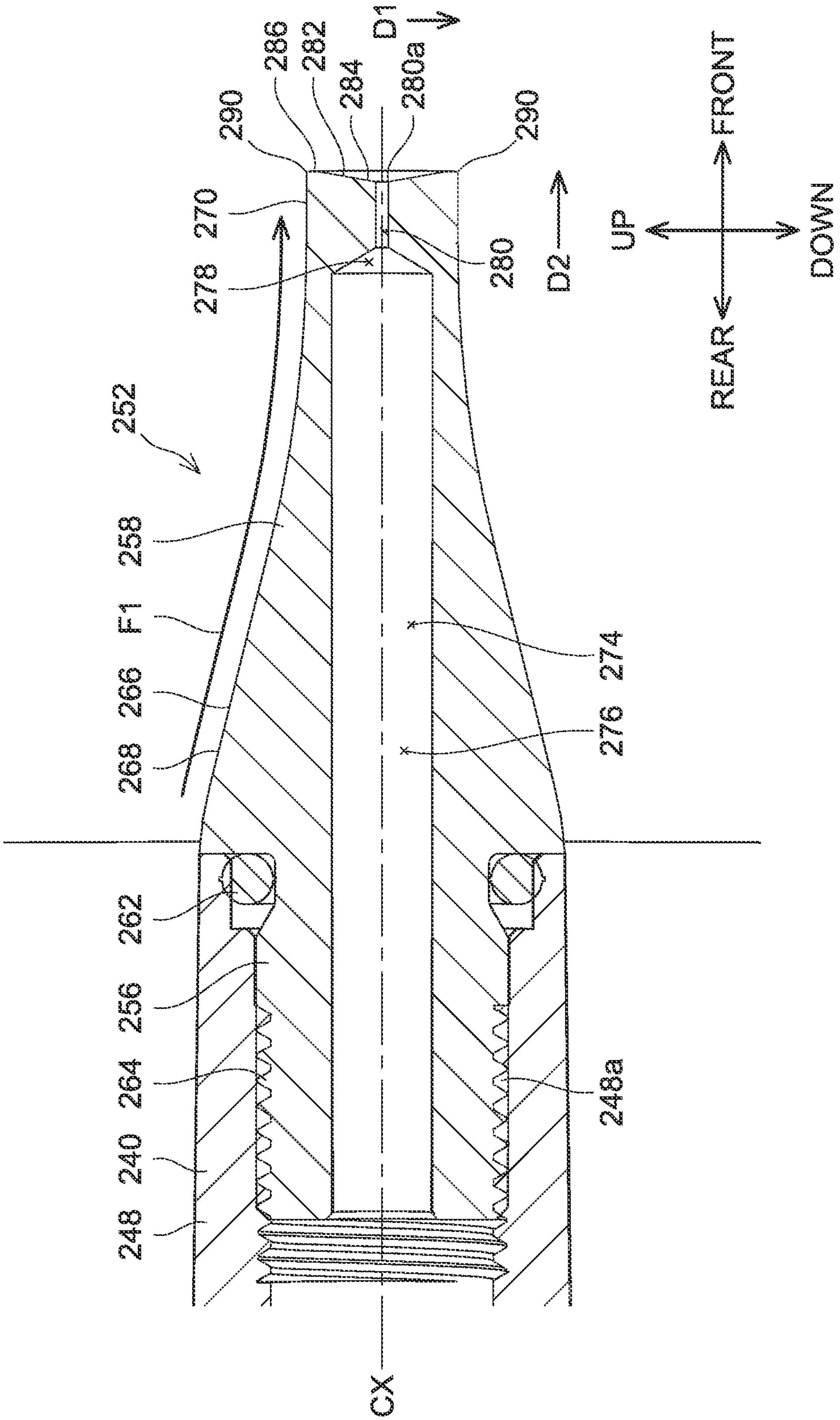

FIG. 24 is a cross-sectional view of a second supply tube 240 and the liquid nozzle 252 of the embodiment.

Figure 25:
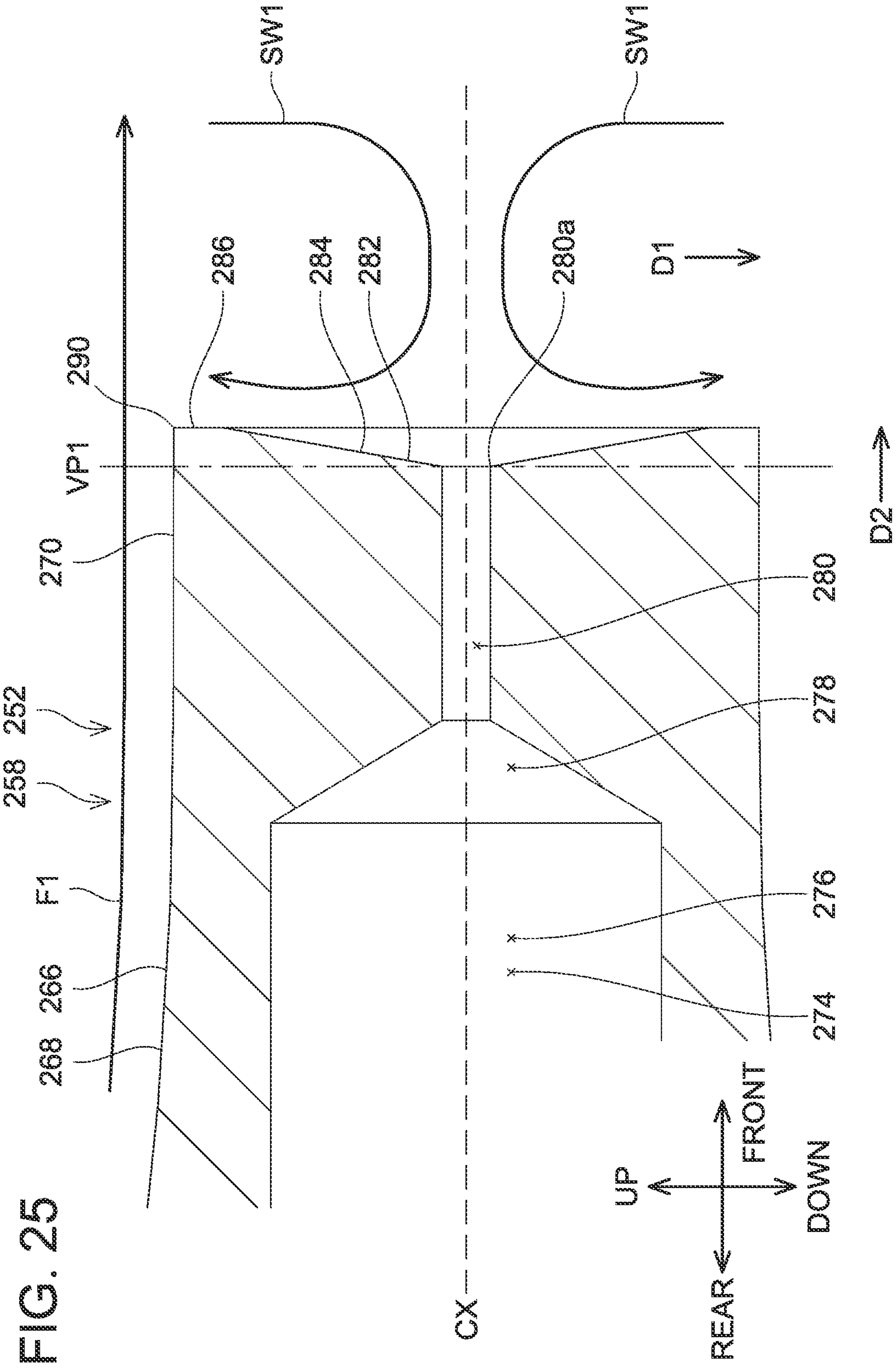

FIG. 25 is an enlarged cross-sectional view of the distal end of the liquid nozzle 252 of the embodiment and its vicinity.

Figure 26:
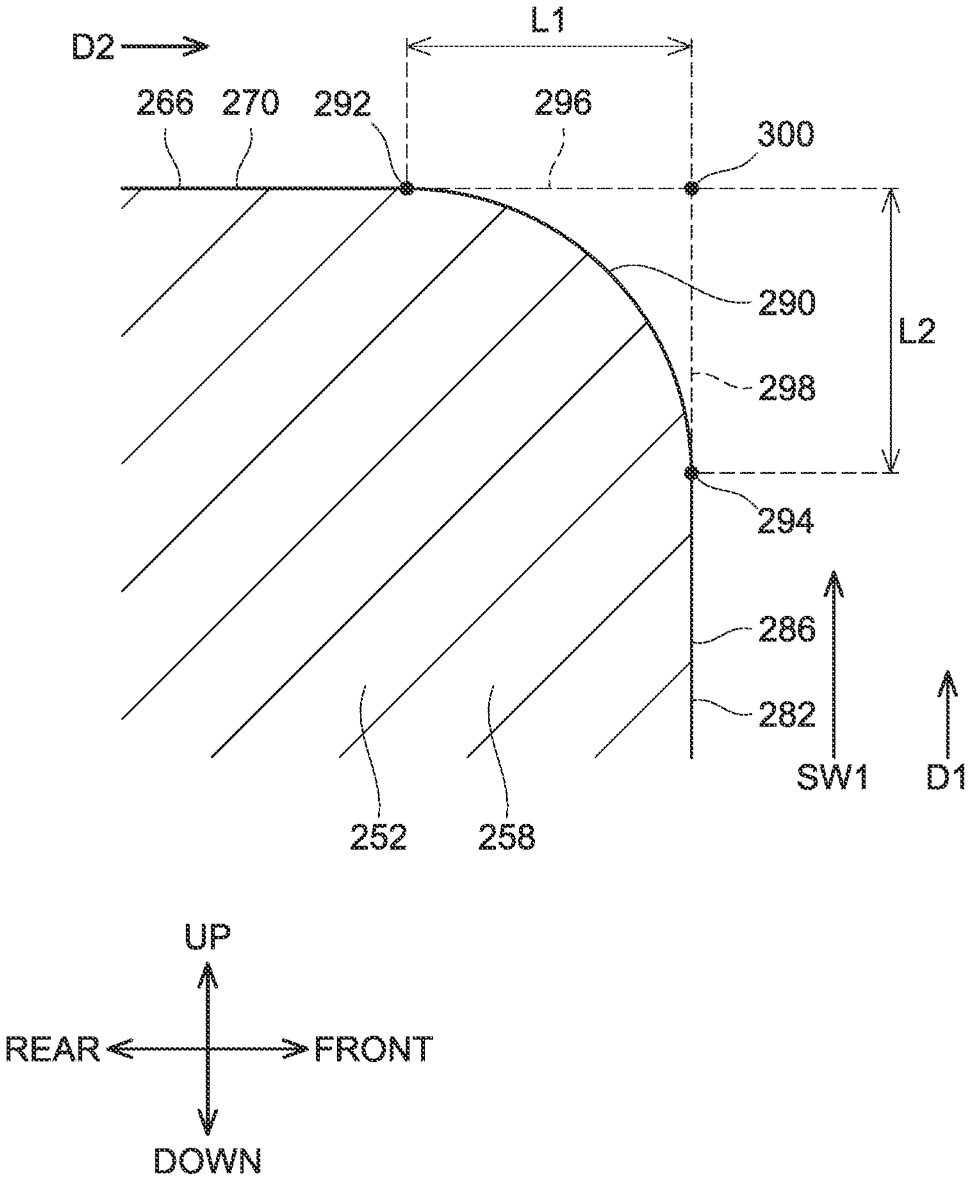

FIG. 26 is an enlarged cross-sectional view of a corner part 290 of the liquid nozzle 252 of the embodiment and its vicinity.

Figure 27:
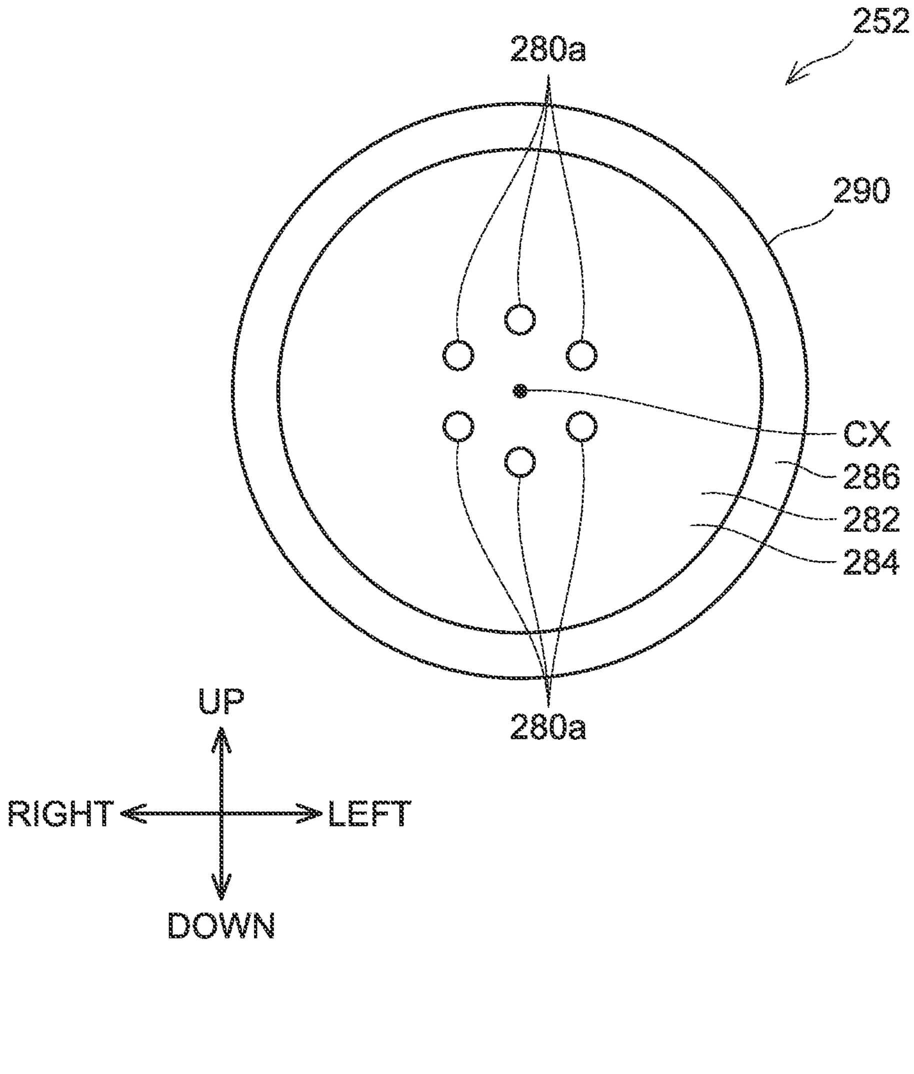

FIG. 27 is a front view of a liquid nozzle 252 of a variant, viewed from the front side.

Figure 28:
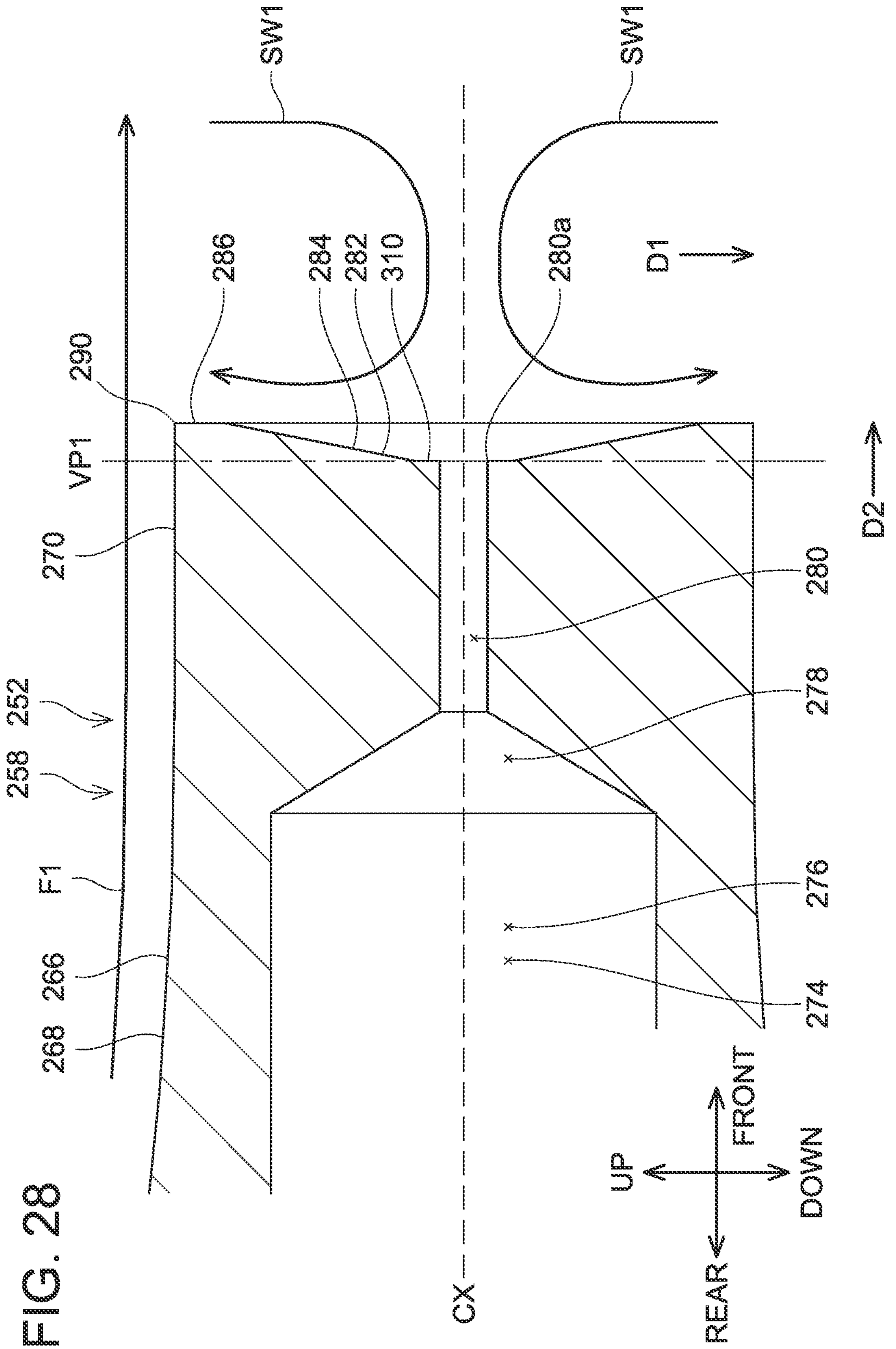

FIG. 28 is an enlarged cross-sectional view of the distal end of the liquid nozzle 252 of the variant and its vicinity.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved backpack working machines, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the battery unit may be disposed above the fan unit. The liquid tank may be disposed above the battery unit.

According to the above configuration, since the liquid tank is disposed above the fan unit and the battery unit, the liquid can easily be supplied to the liquid tank. Further, since the fan unit is disposed below the battery unit and the liquid tank, a tube in which the air delivered by the fan flows can be disposed at a lower position as compared to the case in which the fan unit is not disposed below the battery unit or the liquid tank. Due to this, for example, the tube can be suppressed from coming into contact with user's body around the ribs during work. According to the above configuration, the liquid can more efficiently be supplied to the liquid tank, and the working machine can be suppressed from becoming difficult to use for the user when the user wears the backpack working machine on his/her back.

In one or more embodiments, the body unit may further comprise a facing surface that faces aback of the user when the shoulder harness unit is worn on the shoulders of the user. With respect to a front-rear direction perpendicular to the facing surface, a gravity center position of the battery unit, a gravity center position of the fan unit, and a gravity center position of the liquid tank may be disposed in a region of the body unit, the region having a width that is one-third of a width of the body unit in the front-rear direction.

According to the above configuration, even when the amount of the liquid stored in the liquid tank decreases as the backpack working machine is used to work, the gravity center position of the body unit tends not to move in the direction separating away from the user's back wearing the backpack working machine. Due to this, the working machine can be suppressed from becoming difficult to use for the user.

In one or more embodiments, a gravity center position of the body unit may be on a facing surface side relative to a center position of the body unit in the front-rear direction.

According to the above configuration, a force acting in the direction separating away from the user's back tends not to be applied to the body unit when the user wears the backpack working machine on his/her back. Due to this, the working machine can be suppressed from becoming difficult to use for the user.

In one or more embodiments, the shoulder harness unit may comprise: a right shoulder harness attached to the body unit at a first attaching part and configured to be worn on a right shoulder of the user; and a left shoulder harness attached to the body unit at a second attaching part and configured to be worn on a left shoulder of the user. With respect to a left-right direction perpendicular to the up-down direction and the front-rear direction, a gravity center position of the body unit may be between the first attaching part and the second attaching part.

According to the above configuration, when the user wears the backpack working machine on his/her back, imbalance in the backpack working machine in the left-right direction can be suppressed. Due to this, the working machine can further be suppressed from becoming difficult to use for the user.

In one or more embodiments, with regard to a left-right direction perpendicular to the up-down direction and the front-rear direction, the gravity center position of the battery unit, the gravity center position of the fan unit, and the gravity center position of the liquid tank may be disposed in a region of the body unit, the region having a width one-third of a width of the body unit in the left-right direction.

According to the above configuration, even when the amount of the liquid stored in the liquid tank decreases as the backpack working machine is used to work, the gravity center position of the body unit tends not to move in the left-right direction. Due to this, the working machine can further be suppressed from becoming difficult to use for the user.

EMBODIMENTS

Figure 1:
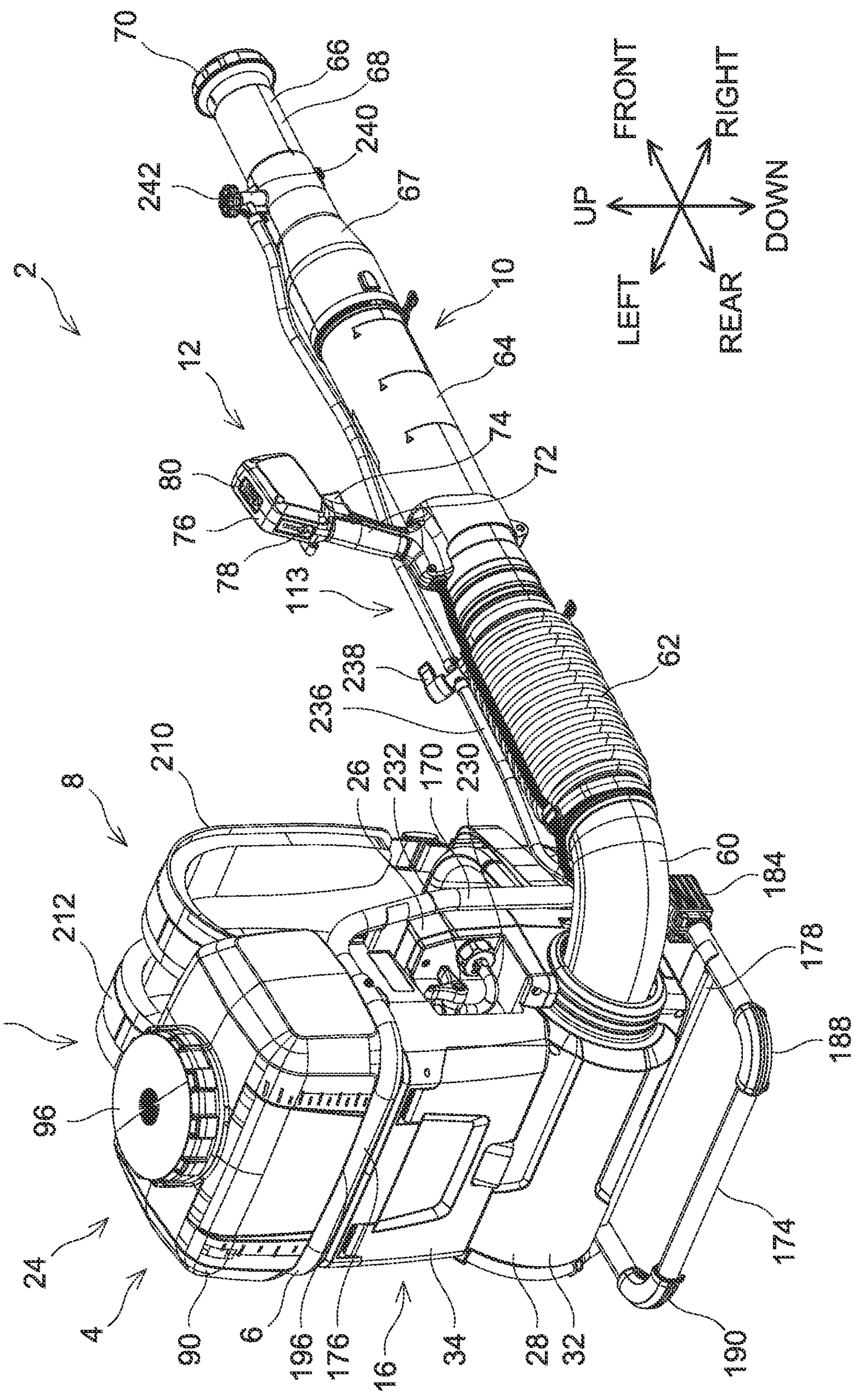
Figure 2:
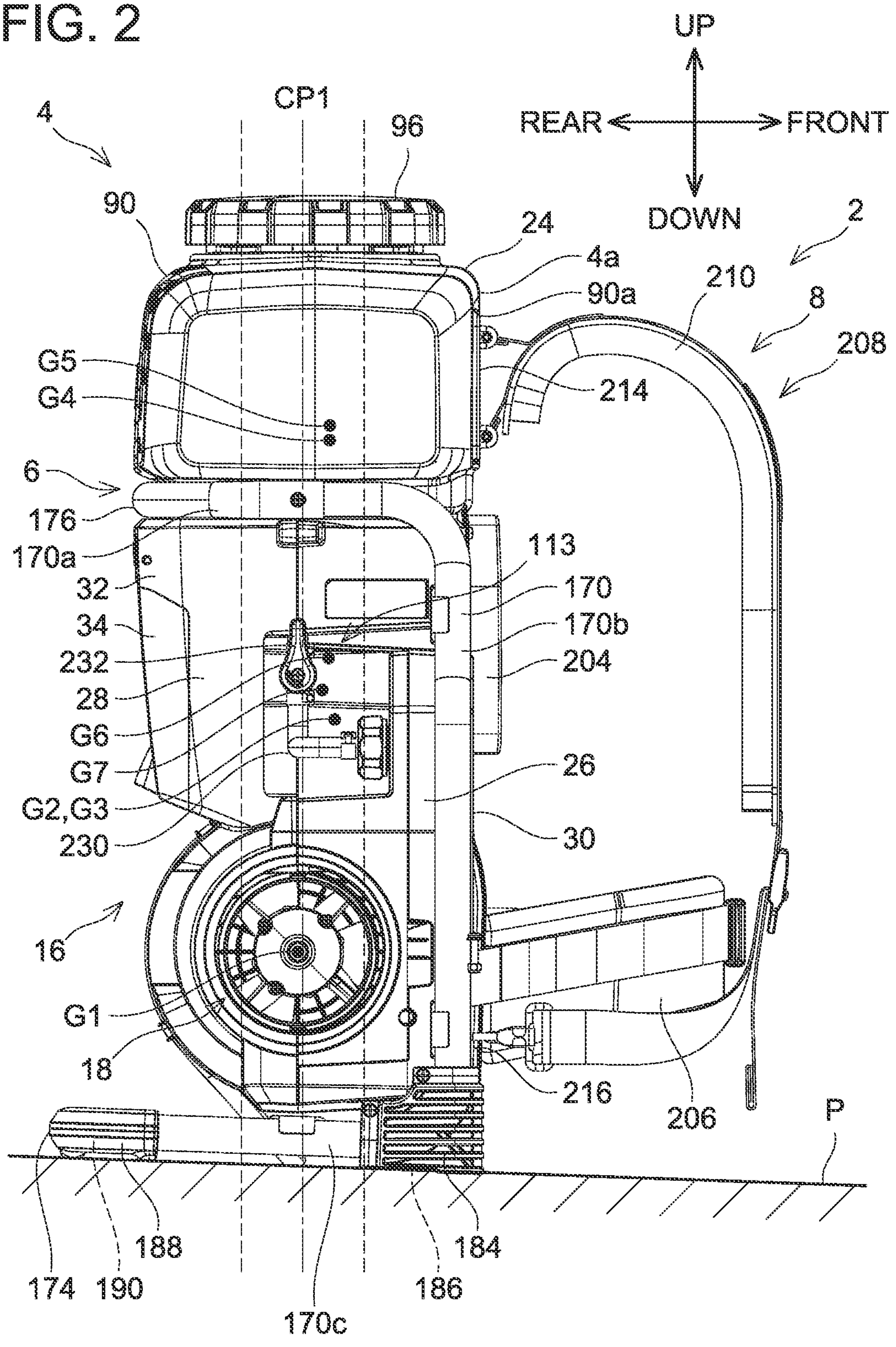

As shown in FIG. 1, a working machine 2 is a backpack working machine. The working machine 2 is configured to eject (spray) liquid. The working machine 2 is for example a mist blower. The liquid is for example a chemical solution or water. The liquid is stored in a liquid tank 24 to be described later. The working machine 2 comprises a body unit 4, a frame unit 6, a harness unit 8, an ejection tube 10, and a handle unit 12. The frame unit 6 is attached to the body unit 4. The harness unit 8 is attached directly and/or indirectly to the body unit 4. The ejection tube 10 is attached to a right lower portion of the body unit 4. The handle unit 12 is attached to the ejection tube 10. A user can spray the liquid from the ejection tube 10 by holding the handle unit 12 and moving the ejection tube 10 while wearing the harness unit 8 and having the working machine 2 on his/her back. As shown in FIG. 2, the body unit 4 comprises a facing surface 4*a* that faces the user's back when the working machine 2 is worn on the user's back. Hereinbelow, a direction that perpendicularly intersects the facing surface 4*a* when the working machine 2 is placed on a placement surface P such as a ground surface will be termed a front-rear direction, a direction perpendicular to the placement surface P will be termed an up-down direction, and a direction that perpendicularly intersects the front-rear direction and the up-down direction will be termed a left-right direction.

Figure 3:
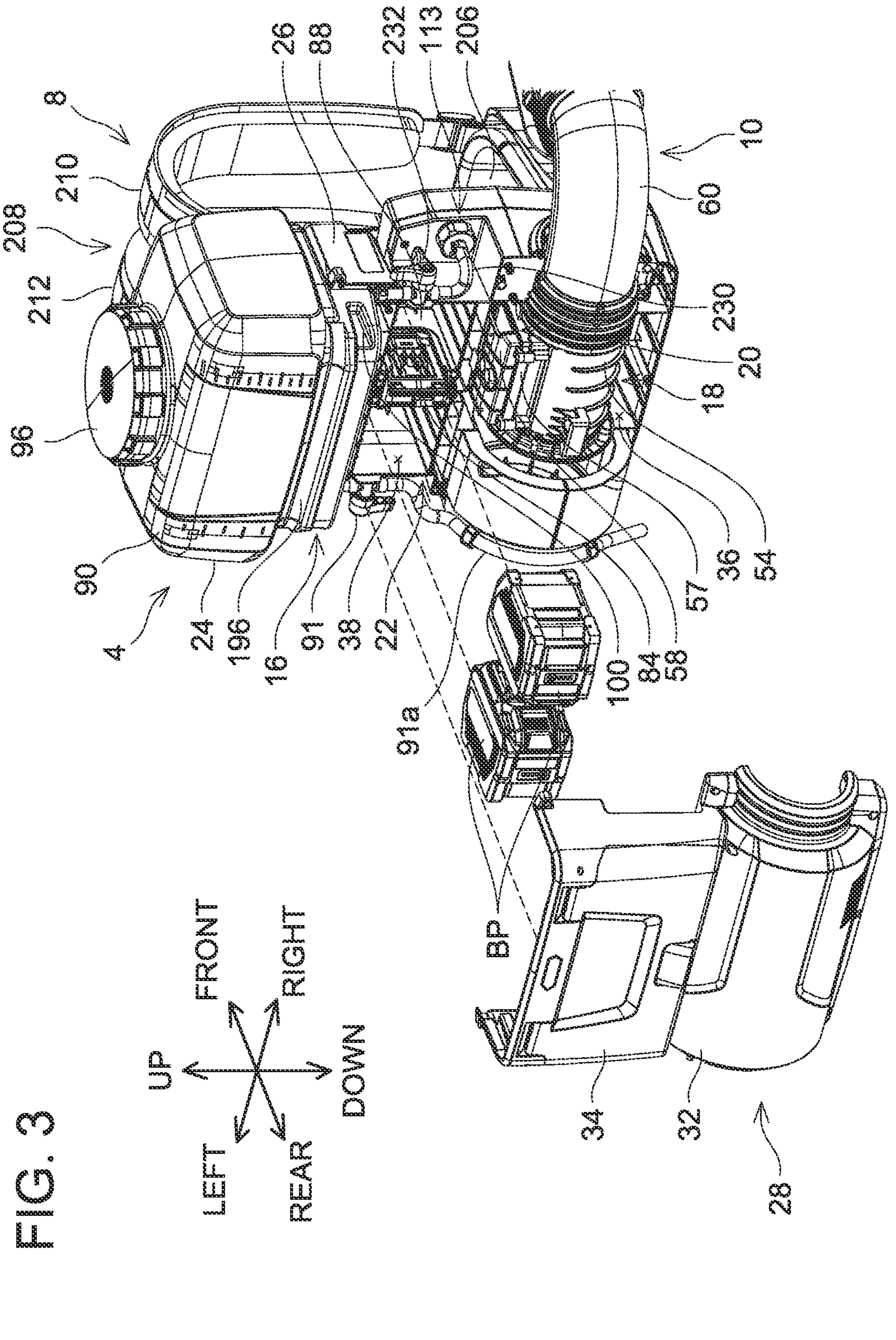
FIG. 3 is a disassembled perspective view of the working machine 2 of the embodiment.

As shown in FIG. 3, the body unit 4 comprises a body housing 16, a fan unit 18, a control unit 20, a battery unit 22, and a liquid tank 24. The body housing 16 supports the fan unit 18, the battery unit 22, and the liquid tank 24. The body housing 16 comprises a front body housing 26 and a rear body housing 28. As shown in FIG. 2, the front body housing 26 comprises a facing surface 30 that faces the user's back when the working machine 2 is worn on the user's back. The facing surface 30 constitutes a part of the facing surface **4*a* of the body unit 4**.

Figure 4:
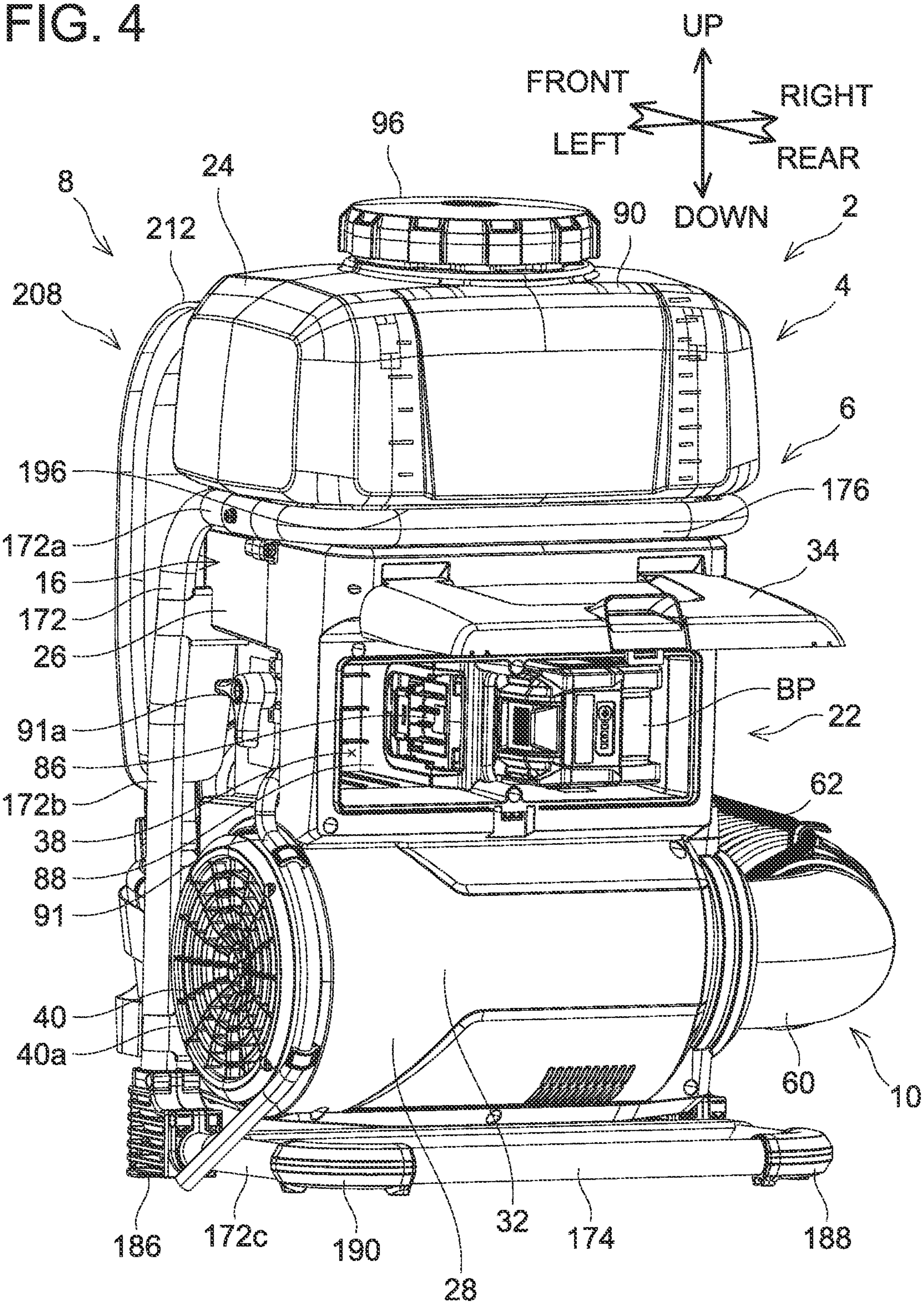
FIG. 4 is a perspective view of the working machine 2 of the embodiment with a cover 34 opened.

As shown in FIG. 4, the rear body housing 28 comprises a body 32 and a cover 34. The body 32 is fixed to the front body housing 26 by screws (not shown). The cover 34 is rotatably attached to the front body housing 26. The cover 34 rotates about a rotation axis extending in the left-right direction. The rotation axis of the cover 34 is disposed higher than the battery unit 22. The cover 34 is disposed rearward of the battery unit 22.

As shown in FIGS. 3 and 4, a first internal space 36 and a second internal space 38 are defined between the front body housing 26 and the rear body housing 28. The fan unit 18 and the control unit 20 are disposed in the first internal space 36. A cover 40 is attached to a lower portion of the left surface of the body housing 16, and the first internal space 36 communicates with the outside of the working machine 2 via intake openings **40*a* of the cover 40. The second internal space 38 is disposed above the first internal space 36. The second internal space 38 is partitioned from the first internal space 36. The battery unit 22 is disposed in the second internal space 38. Due to this, battery packs BP to be described later are disposed in the second internal space 38. By opening the cover 34 upward, the second internal space 38 communicates with the outside of the working machine 2**.

Figure 5:
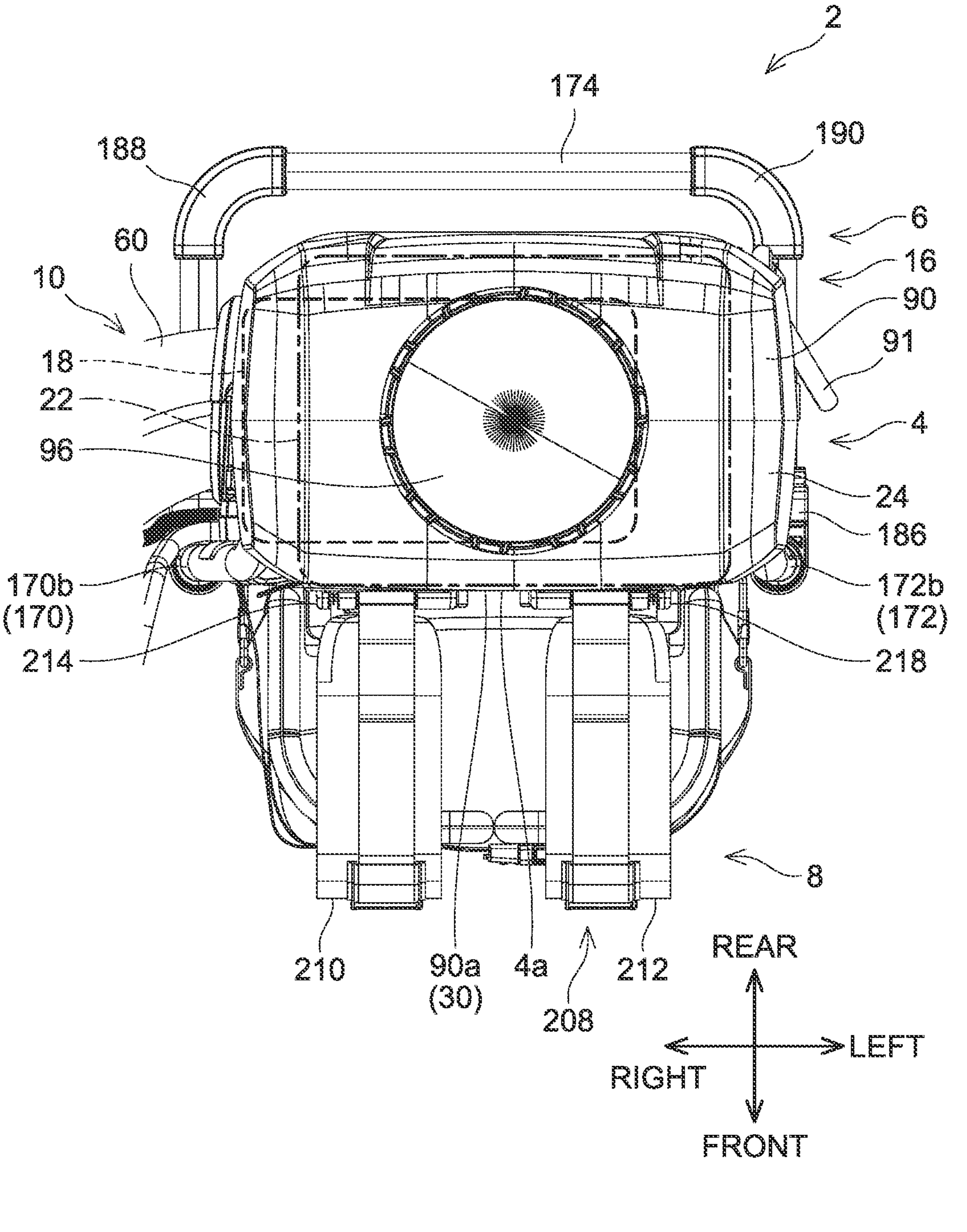
FIG. 5 is a top view of the working machine 2 of the embodiment.

The fan unit 18, the battery unit 22, and the liquid tank 24 are arranged along the up-down direction. The battery unit 22 is disposed above the fan unit 18, and the liquid tank 24 is disposed above the battery unit 22. As shown in FIG. 5, when the working machine 2 is viewed from above with the working machine 2 placed on the placement surface P (see FIG. 2), a region of the liquid tank 24 which is at least 50% of the liquid tank 24 overlaps each of the fan unit 18 and the battery unit 22. In FIG. 5, an outer shape of the fan unit 18 is depicted by a broken line, and an outer shape of the battery unit 22 is depicted by a one-dot chain line. Further, a region of the fan unit 18 which is at least 50% of the fan unit 18 overlaps each of the battery unit 22 and the liquid tank 24. Moreover, a region of the battery unit 22 which is at least 50% of the battery unit 22 overlaps each of the fan unit 18 and the liquid tank 24.

Next, gravity center positions will be explained with reference to FIGS. 2 and 6. A gravity center position of the fan unit 18 is at a gravity center position G1. Further, when two battery packs BP are disposed in the second internal space 38, a gravity center position of the battery unit 22 is at a gravity center position G2, and when the two battery packs BP are not disposed in the second internal space 38, the gravity center position of the battery unit 22 is at a gravity center position G3. Further, when the liquid is stored at a maximum capacity in the liquid tank 24, a gravity center position of the liquid tank 24 is at a gravity center position G4, and when no liquid is stored in the liquid tank 24, the gravity center position of the liquid tank 24 is at a gravity center position G5. Further, when the two battery packs BP are disposed in the second internal space 38 and the liquid is stored at the maximum capacity in the liquid tank 24, a gravity center position of the body unit 4 is at a gravity center position G6, and when the two battery packs BP are disposed in the second internal space 38 and no liquid is stored in the liquid tank 24, the gravity center position of the body unit 4 is at a gravity center position G7.

As shown in FIG. 2, the gravity center positions G2, G3 of the battery unit 22 substantially match in the front-rear direction and in the up-down direction. The gravity center position G4 of the liquid tank 24 substantially matches the gravity center position G5 in the front-rear direction but is at a position slightly lower than the gravity center position G5 in the up-down direction. The gravity center position G6 of the body unit 4 is at a position slightly rearward of the gravity center position G7 in the front-rear direction and is at a position higher than the gravity center position G7 in the up-down direction.

In the front-rear direction, the gravity center position G1 of the fan unit 18, the gravity center positions G2, G3 of the battery unit 22, the gravity center positions G4, G5 of the liquid tank 24, and the gravity center positions G6, G7 of the body unit 4 are disposed in a region having a width that is one-third (⅓) of a width of the body unit 4 in the front-rear direction (in the present embodiment, in a region having a width that is one-sixth (⅙) of the width of the body unit 4 in the front-rear direction). In FIG. 2, a region having a width that is one-third (⅓) of the width of the body unit 4 in the front-rear direction is shown by a broken line. The gravity center position G1 is in the vicinity of a center position CP1 of the body unit 4 in the front-rear direction. The gravity center positions G2, G3, G4, G5, G6, G7 are on a facing surface **4*a* side (forward) relative to the center position CP1. The center position CP1 is at the center between front and rear ends of the body unit 4. In FIG. 2, the center position CP1** is indicated by a one-dot chain line.

Figure 6:
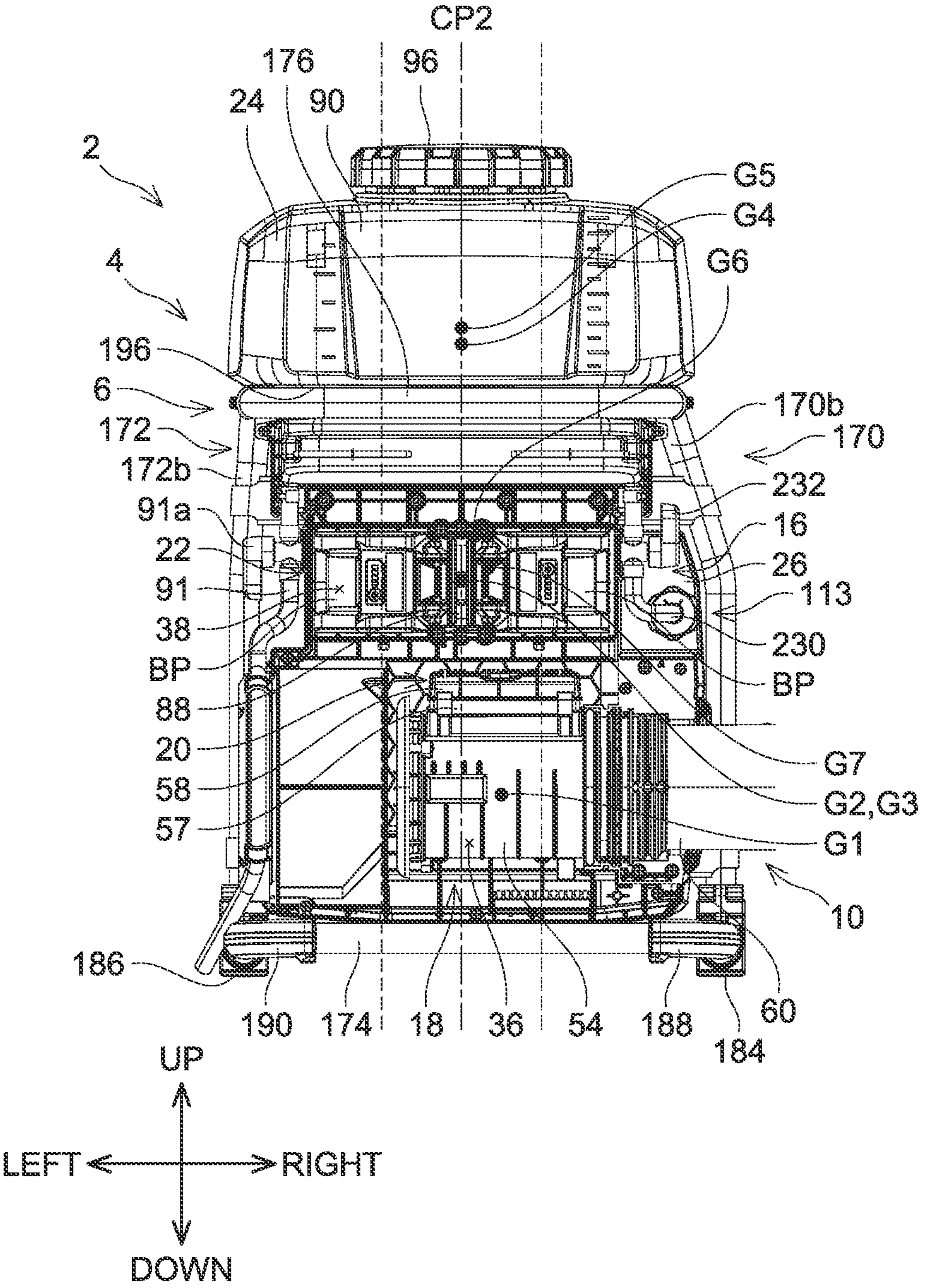
FIG. 6 is a rear view of the working machine 2 of the embodiment with a rear body housing 28 detached.

As shown in FIG. 6, the gravity center positions G2, G3 of the battery unit 22 substantially match in the left-right direction. The gravity center positions G4, G5 of the liquid tank 24 substantially match in the left-right direction. The gravity center position G6 of the body unit 4 is away from the ejection tube 10 (leftward) than the gravity center position G7 is in the left-right direction.

In the left-right direction, the gravity center position G1 of the fan unit 18, the gravity center positions G2, G3 of the battery unit 22, the gravity center positions G4, G5 of the liquid tank 24, and the gravity center positions G6, G7 of the body unit 4 are disposed in the region having a width that is one-third (⅓) of the width of the body unit 4 in the left-right direction (in the present embodiment, region having a width that is one-sixth (⅙) of the width of the body unit 4 in the left-right direction). In FIG. 6, the region having a width that is one-third (⅓) of the width of the body unit 4 in the left-right direction is indicated by a broken line. The gravity center positions G1, G6, G7 are on an ejection tube 10 side (rightward) relative to a center position CP2 of the body unit 4 in the left-right direction. The gravity center positions G2, G3, G4, G5 are in the vicinity of the center position CP2 of the body unit 4 in the left-right direction. The center position CP2 is at the center between the right and left ends of the body unit 4. In FIG. 6, the center position CP2 is indicated by a one-dot chain line.

Figure 7:
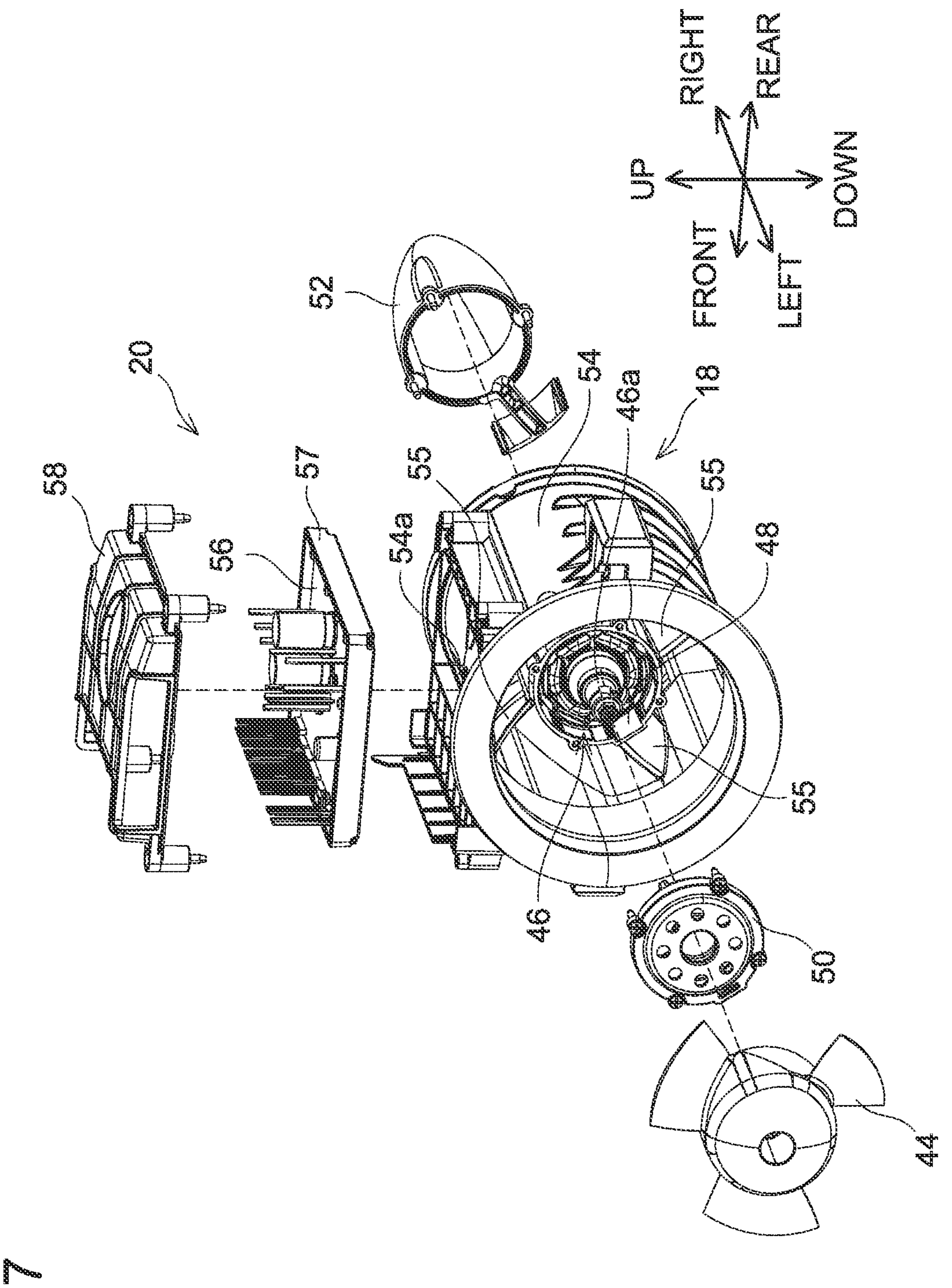
FIG. 7 is a disassembled perspective view of a fan unit 18 and a control unit 20 of the embodiment.

As shown in FIG. 7, the fan unit 18 comprises a fan 44, an electric motor 46, a motor housing 48, a lid member 50, a cone 52, and a tubular member 54. The fan 44 is for example an axial fan. A shaft **46*a* of the electric motor 46 is coupled to the fan 44. The electric motor 46 is configured to rotate the fan 44. The electric motor 46 is for example a brushless motor. The motor housing 48 houses the electric motor 46. A plurality of rectifying fins 55 is arranged on an outer surface of the motor housing 48. The lid member 50 closes the left end of the motor housing 48. The cone 52 is coupled to the right end of the motor housing 48. The tubular member 54 has a substantially cylindrical shape. The tubular member 54 houses the fan 44, the electric motor 46, the motor housing 48, and the lid member 50 therein. An inner surface of the tubular member 54 is coupled with the rectifying fins 55. The tubular member 54 is supported by the body housing 16 (see FIG. 3**).

The control unit 20 is attached to an upper portion of the tubular member 54. The control unit 20 comprises a control board 56 including a plurality of switching elements (not shown) and a microcomputer. The control board 56 is configured to control rotation of the electric motor 46. The control board 56 is housed in the casing 57. An opening 54*a* is defined in the upper portion of the tubular member 54, and at least a part of the lower surface of the casing 57 closes the opening 54*a* of the tubular member 54. The casing 57 is constituted for example of a metal material. The control unit 20 is covered by the cover member 58. The casing 57 and the cover member 58 are attached to the tubular member 54.

Figure 8:
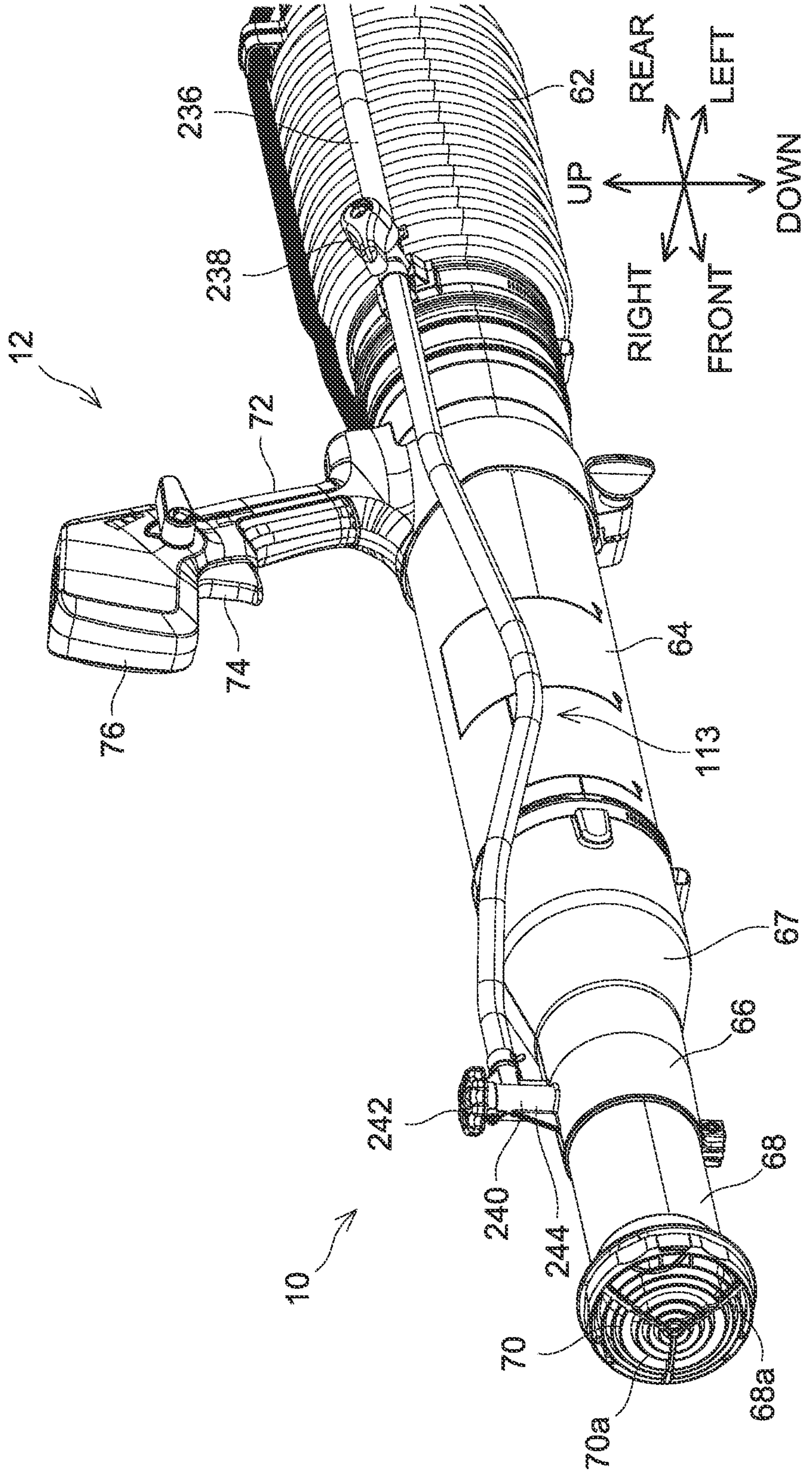
FIG. 8 is a perspective view of the ejection tube 10 of the embodiment.

The ejection tube 10 shown in FIG. 1 is attached to the tubular member 54. The ejection tube 10 is disposed on the right side of the body unit 4. The ejection tube 10 comprises a curved tube 60 attached to the tubular member 54 (see FIG. 3), a bellows tube 62 attached to the curved tube 60, an intermediate tube 64 attached to the bellows tube 62, and a distal end tube 66 attached to the intermediate tube 64. The bellows tube 62 is configured to adjust orientations of the intermediate tube 64 and the distal end tube 66. As shown in FIG. 8, a dome-shaped spray cover 70 is attached to the distal end of the distal end tube 66.

The handle unit 12 is attached to the intermediate tube 64. The handle unit 12 comprises a grip 72 configured to be gripped by the user, a trigger 74 attached to the grip 72, and a head 76 attached to the grip 72. The user can adjust the orientations of the intermediate tube 64 and the distal end tube 66 by gripping the grip 72 and moving the handle unit 12. Further, the user can pull the trigger 74 with a finger of the hand holding the grip 72. When the trigger 74 is pulled, a signal is sent to the control board 56 (see FIG. 7).

As shown in FIG. 1, the head 76 comprises a main power button 78 and an adjust button 80. The main power button 78 is disposed on the rear surface of the head 76. The main power button 78 is configured to accept user's operation to switch the working machine 2 between an on state and an off state. The user can operate the main power button 78 with a finger of the hand holding the grip 72. When the main power button 78 is operated, a signal is sent to the control board 56 (see FIG. 7). The adjust button 80 is disposed on an upper surface of the head 76. The adjust button 80 is configured to accept user's operation to adjust a rotary speed of the electric motor 46 (see FIG. 7). The user can operate the adjust button 80 with a finger of the hand opposite the hand holding the grip 72. When the adjust button 80 is operated, a signal is sent to the control board 56.

When the trigger 74 is pulled by the user while the working machine 2 is in the on state, as shown in FIG. 7, the control board 56 causes the shaft 46*a* of the electric motor 46 to rotate, by which the fan 44 rotates. Due to this, as shown in FIG. 3, air flows into the first internal space 36 from outside the working machine 2 through the plurality of intake openings 40*a* (see FIG. 4). The air that flowed in further flows into the tubular member 54. As shown in FIG. 7, the air that flowed in is delivered by the fan 44, rectified by the plurality of rectifying fins 55, and thereafter flows along the cone 52. Since at least a part of the lower surface of the casing 57 closes the opening 54*a* of the tubular member 54, the air delivered by the fan 44 flows along the lower surface of the casing 57. Due to this, the casing 57 is cooled, as a result of which the control unit 20 (control board 56) is cooled. After this, the air flows inside the ejection tube 10 shown in FIG. 8 and moves through the spray cover 70, and is ejected to the outside of the working machine 2. The air is guided outward in the radial direction of the distal end tube 66 by spray fins 70*a* of the spray cover 70, and is ejected over a wide area.

As shown in FIGS. 3 and 4, the battery unit 22 is disposed above the fan unit 18 and the control unit 20. The battery unit 22 comprises a right battery attaching part 84, a left battery attaching part 86, and the plurality of (two in the present embodiment) battery packs BP. The right battery attaching part 84 and the left battery attaching part 86 are aligned along the left-right direction. A center wall 88 is disposed in the second internal space 38, the right battery attaching part 84 is disposed on the right surface of the center wall 88 and the left battery attaching part 86 is disposed on the left surface of the center wall 88. The center wall 88 is disposed at the center of the second internal space 38 in the left-right direction. The center wall 88 is disposed on a plane extending along the up-down direction and the front-rear direction.

The battery packs BP can be detachably attached to the right battery attaching part 84 and the left battery attaching part 86 in the state where the cover 34 is open. The battery packs BP can each be attached to the right battery attaching part 84 and to the left battery attaching part 86 by sliding them in the front-rear direction. The battery packs BP comprise lithium-ion batteries, for example. Electric power of the battery packs BP can be supplied to the electric motor 46 (see FIG. 7). When the battery packs BP are attached to both the right battery attaching part 84 and the left battery attaching part 86, the electric power is supplied to the electric motor 46, at first from one of the battery packs BP, which is in the present embodiment the right battery pack BP disposed on the ejection tube 10 side. When the remaining charge of the right battery pack BP runs out, the electric power is then supplied to the electric motor 46 from the battery pack BP on the left. In this state, when the right battery pack BP of which remaining charge has run out is detached from the right battery attaching part 84, the gravity center positions G6, G7 of the body unit 4 (see FIG. 6) move in a direction separating away from the ejection tube 10 (leftward). When the working machine 2 is worn on the user's back, the working machine 2 is suppressed from tilting toward the ejection tube 10.

Figure 9:
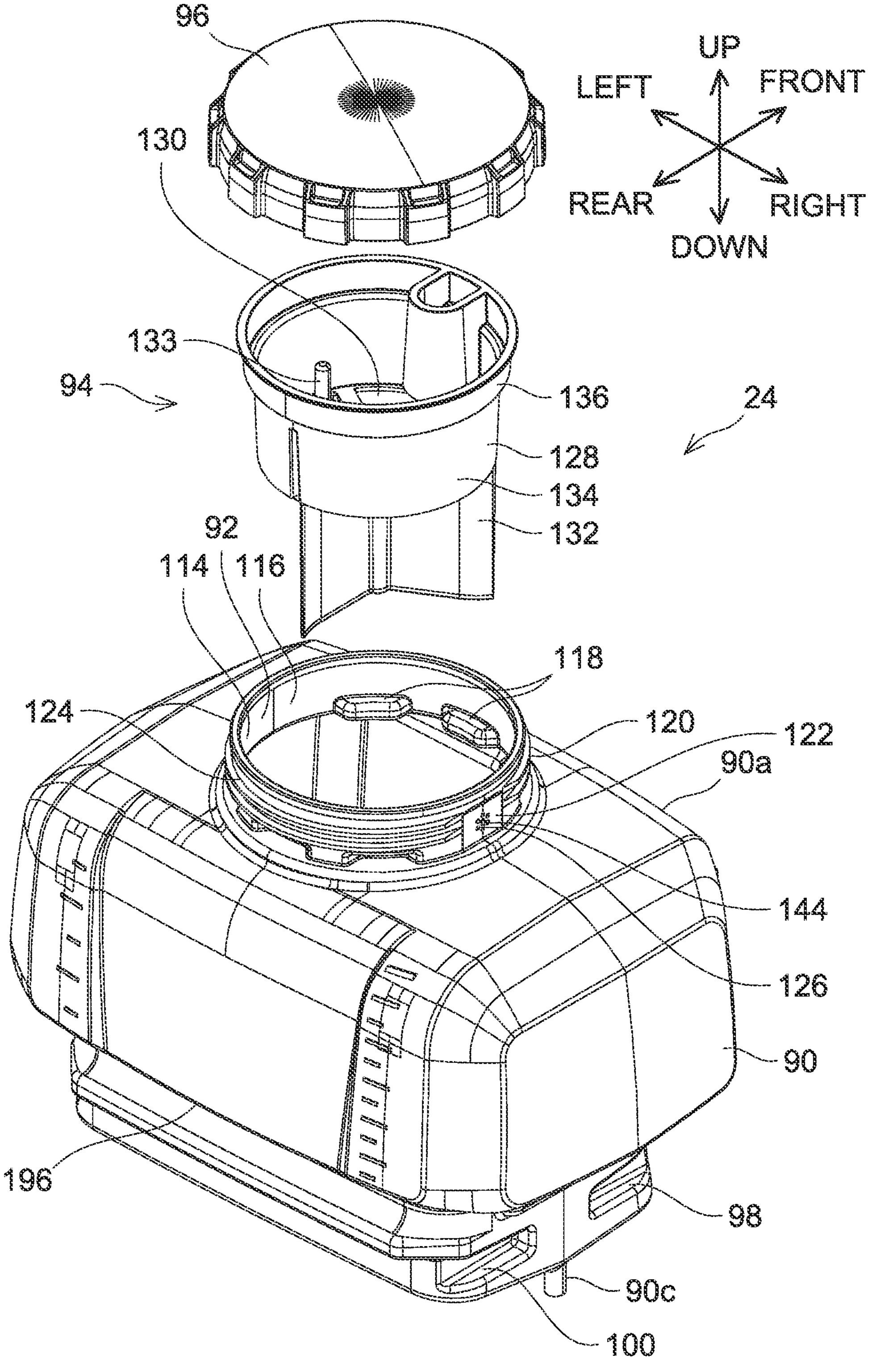
FIG. 9 is a disassembled perspective view of a liquid tank 24 of the embodiment.

The liquid tank 24 is disposed above the battery unit 22. As shown in FIG. 9, the liquid tank 24 comprises a tank body 90, a projection 92, a filter unit 94, and a tank cap 96. The tank body 90 stores the liquid for ejection (spraying). Capacity of the tank body 90 is for example 10 L or more, and in the present embodiment, 15 L. The tank body 90 comprises a facing surface 90*a* that faces the user's back when the working machine 2 is worn on the user's back. The facing surface 90*a* constitutes a part of the facing surface 4*a* of the body unit 4 (see FIG. 2).

Figure 10:
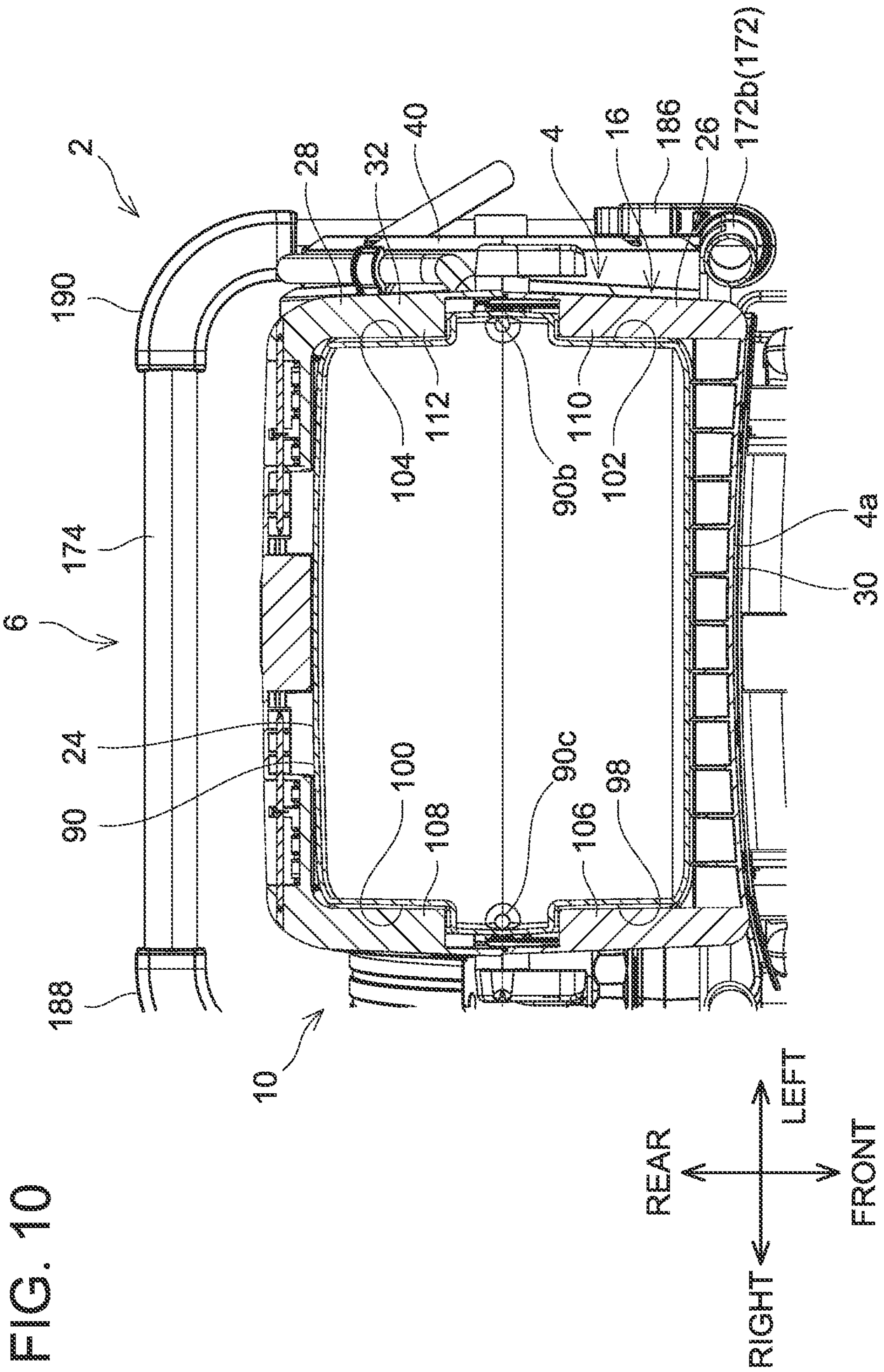
FIG. 10 is a horizontal cross-sectional view of the working machine 2 of the embodiment.

A first engaging groove 98 and a second engaging groove 100 are defined in the vicinity of a lower portion of the right end of the tank body 90. The first engaging groove 98 and the second engaging groove 100 are recessed toward inside of the tank body 90. As shown in FIG. 10, a third engaging groove 102 and a fourth engaging groove 104 are defined in the vicinity of a lower portion of the left end of the tank body 90. The third engaging groove 102 and the fourth engaging groove 104 are recessed toward inside of the tank body 90. A first engaging wall 106, a second engaging wall 108, a third engaging wall 110, and a fourth engaging wall 112 are disposed in the body housing 16. When the tank body 90 is placed between the front body housing 26 and the rear body housing 28, the first engaging wall 106 engages with the first engaging groove 98, the second engaging wall 108 engages with the second engaging groove 100, the third engaging wall 110 engages with the third engaging groove 102, and the fourth engaging wall 112 engages with the fourth engaging groove 104. Due to this, a lower portion of the tank body 90 is placed inside the body housing 16 and fixed to the body housing 16 in the body housing 16. As shown in FIG. 1, when the tank body 90 is fixed to the body housing 16, an upper portion of the tank body 90 is disposed above the body housing 16.

As shown in FIG. 11, a discharging portion 90*b* and a supplying portion 90*c* are disposed at the lower end of the tank body 90. A discharge tube 91 is connected to the discharging portion 90*b*. The discharge tube 91 is constituted of a resin material, for example. Normally, a discharge cock 91*a* on the discharge tube 91 is closed. By opening the discharge cock 91*a*, the user can discharge the liquid stored in the tank body 90 to outside the liquid tank 24 through the discharging portion 90*b* and the discharge tube 91. A supply line 113 is connected to the supplying portion 90*c*. The supply line 113 will be described later in detail.

As shown in FIG. 9, the projection 92 is connected to an upper surface (upper portion) of the tank body 90. When the working machine 2 is placed on the placement surface P (see FIG. 2), the projection 92 is disposed higher than the upper surface of the tank body 90. The projection 92 comprises a sidewall 114 having a substantially cylindrical shape. The sidewall 114 defines a supply opening 116. The supply opening 116 is defined by an inner surface of the sidewall 114. In other words, the supply opening 116 is arranged in the projection 92 and the projection 92 is constituted of the sidewall 114. The supply opening 116 is an opening for supplying liquid into the tank body 90. A plurality of ribs 118 is disposed on the inner surface of the sidewall 114. The plurality of ribs 118 extends inward in a radial direction of the sidewall 114.

The sidewall 114 comprises a first side portion 120 and a second side portion 122. The first side portion 120 has a substantially cylindrical shape. The first side portion 120 comprises an engagement receiving rail 124 disposed on the outer surface of the first side portion 120. The engagement receiving rail 124 extends spirally along the circumferential direction of the outer surface of the first side portion 120. The engagement receiving rail 124 is partially discontinued along the circumferential direction of the outer surface of the first side portion 120.

The second side portion 122 is connected to the first side portion 120. An outer surface of the second side portion 122 has a flat surface shape. In a variant, the outer surface of the second side portion 122 may have a curved surface shape. The outer surface of the second side portion 122 does not have the engagement receiving rail 124 in the circumferential direction of the sidewall 114. As shown in FIG. 12, the outer surface of the second side portion 122 is recessed inward in the radial direction of the sidewall 114 as compared to the outer surface of the first side portion 120. The outer surface of the second side portion 122 and the outer surface of the first side portion 120 are separated away from the inner surface of the tank cap 96. A distance between the outer surface of the second side portion 122 and the inner surface of the tank cap 96 is greater than a distance between the outer surface of the first side portion 120 and the inner surface of the tank cap 96.

As shown in FIG. 9, the second side portion 122 has a plurality of (six in the present embodiment) communication holes 126. The plurality of communication holes 126 penetrates the second side portion 122 in a thickness direction.

The filter unit 94 comprises a base member 128, a filter 130, fins 132, and a handle 133. The base member 128 comprises a first cylinder portion 134 having a substantially cylindrical shape and a second cylinder portion 136 having a substantially cylindrical shape with a larger diameter than the first cylinder portion 134. The first cylinder portion 134 supports the filter 130. The filter 130 is disposed at a lower end opening of the first cylinder portion 134. When the liquid is to be supplied into the tank body 90, the filter 130 filters foreign matters such as sand contained in the liquid. The second cylinder portion 136 is coupled to the upper end of the first cylinder portion 134. As shown in FIG. 13, when the filter unit 94 is attached to the projection 92, the lower end of the second cylinder portion 136 is placed on the plurality of ribs 118.

As shown in FIG. 9, the fins 132 are coupled to the lower end of the first cylinder portion 134. The handle 133 is coupled to the first cylinder portion 134. When the user causes the filter unit 94 to rotate by holding the handle 133, the fins 132 rotate to stir the liquid inside the tank body 90.

The tank cap 96 is capable of closing the supply opening 116 of the sidewall 114 from above. The tank cap 96 has a substantially cylindrical shape having its bottom wall at its upper end. As shown in FIG. 13, the tank cap 96 comprises an engaging rail 140 arranged on the inner surface of the tank cap 96. The engaging rail 140 extends spirally along the circumferential direction of the inner surface of the tank cap 96. When the tank cap 96 closes the supply opening 116 of the sidewall 114, the engaging rail 140 meshes with the engagement receiving rail 124.

As shown in FIG. 14, when the engaging rail 140 is meshed with the engagement receiving rail 124 and the tank cap 96 closes the supply opening 116, the tank cap 96 covers the plurality of communication holes 126. Even in this state, the plurality of communication holes 126 connects the inside of the liquid tank 24 and the outside of the working machine 2 such that they communicate with each other. Further, a communicating space 142 is defined between the tank cap 96 and the sidewall 114. A width of the communicating space 142, that is, a distance between the inner surface of the tank cap 96 and the outer surface of the sidewall 114 in the circumferential direction of the sidewall 114 is at the maximum between the outer surface of the second side portion 122 and the inner surface of the tank cap 96. The communicating space 142 directly communicates with the plurality of communication holes 126. The communicating space 142 directly communicates with the outside of the working machine 2 at its lower end.

The liquid tank 24 further comprises a check valve 144. The check valve 144 is attached to the second side portion 122. The check valve 144 is for example an umbrella valve. The check valve 144 is for example constituted of an elastic material, such as a rubber material in the present embodiment. The check valve 144 comprises a fixing part 146 and a valve part 148. The fixing part 146 is inserted and fixed in the second side portion 122. The valve part 148 is coupled to an end of the fixing part 146. The valve part 148 has a circular disk shape, for example. The valve part 148 is configured to deform elastically. The valve part 148 is disposed inside the liquid tank 24 between the second side portion 122 and the base member 128. The valve part 148 is capable of abutting the inner surface of the second side portion 122. By abutting the inner surface of the second side portion 122, the valve part 148 is configured to prohibit a fluid (such as air and/or liquid) to flow from inside the liquid tank 24 to the outside of the working machine 2 through the plurality of communication holes 126. Further, by separating from the inner surface of the second side portion 122, the valve part 148 is configured to allow the fluid to flow from the outside of the working machine 2 into the liquid tank 24 through the plurality of communication holes 126.

The valve part 148 is in contact with the inner surface of the second side portion 122 under its normal state, such as when the working machine 2 is not used to work. Due to this, the plurality of communication holes 126 is closed, and the inside of the liquid tank 24 is not in communication with the outside of the working machine 2 via the plurality of communication holes 126. When the working machine 2 is used to work, for example, when the working machine 2 is used to spray the liquid from the ejection tube 10 (see FIG. 1) or to eject the liquid in the liquid tank 24 out of the liquid tank 24 through the discharging portion 90*b* and the discharge tube 91, the amount of the liquid in the tank body 90 decreases. Due to this, a volume of an empty space in the liquid tank 24 increases. Since the inside of the liquid tank 24 is not in communication with the outside of the working machine 2, a pressure in the empty space in the liquid tank 24 decreases. As shown in FIG. 15, when the pressure in the empty space in the liquid tank 24 becomes lower than a pressure of the outside of the working machine 2 (atmospheric pressure), the valve part 148 elastically deforms and separates away from the inner surface of the second side portion 122. Due to this, the air outside the working machine 2 flows into the communicating space 142 from below the tank cap 96 as shown by an airflow AF in FIG. 15, flows through the communicating space 142 and the plurality of communication holes 126, and flows into the liquid tank 24. Due to this, the pressure in the empty space in the liquid tank 24 increases. This can suppress the occurrence of a situation in which the liquid in the liquid tank 24 cannot smoothly be supplied toward the ejection tube 10 or the liquid in the liquid tank 24 cannot smoothly be discharged out of the liquid tank 24 through the discharging portion 90*b* and the discharge tube 91 due to the decrease in the pressure in the empty space in the liquid tank 24.

The frame unit 6 shown in FIG. 16 is fixed to the body unit 4 (see FIG. 1). The frame unit 6 comprises a pair of side frames 170, 172, a rear frame 174, a top frame 176, a lower frame 178, a first fixing frame 180, and a second fixing frame 182. Hereinbelow, the pair of side frames 170, 172 may be termed a right-side frame 170 and a left-side frame 172. The respective frames 170, 172, 174, 176, 178, 180, 182 are constituted of a metal material, such as aluminum. Further, the respective frames 170, 172, 174, 176, 178, 180, 182 are configured to elastically deform by an external force that acts thereon.

The right-side frame 170 comprises a first right-side frame 170*a* extending in the front-rear direction, a second right-side frame 170*b* extending downward from the front end of the first right-side frame 170*a*, and a third right-side frame 170*c* extending rearward from the lower end of the second right-side frame 170*b*. A first contacting member 184 is attached to a connecting portion between the second right-side frame 170*b* and the third right-side frame 170*c*. The first contacting member 184 is constituted of a resin material such as polycarbonate.

The left-side frame 172 is disposed to the left of the right-side frame 170. The left-side frame 172 comprises a first left-side frame 172*a* extending in the front-rear direction, a second left-side frame 172*b* extending downward from the front end of the first left-side frame 172*a*, and a third left-side frame 172*c* extending rearward from the lower end of the second left-side frame 172*b*. A second contacting member 186 is attached to a connecting portion between the second left-side frame 172*b* and the third left-side frame 172*c*. The second contacting member 186 is constituted of a resin material such as polycarbonate. The second contacting member 186 has the same shape as the first contacting member 184.

The rear frame 174 is coupled to the rear end of the third right-side frame 170*c* and the rear end of the third left-side frame 172*c*. The rear frame 174 is integrated with the pair of side frames 170, 172. The rear frame 174 extends in the left-right direction. A third contacting member 188 is attached to a connecting portion between the rear frame 174 and the third right-side frame 170*c*. Further, a fourth contacting member 190 is attached to a connecting portion between the rear frame 174 and the third left-side frame 172*c*. The third contacting member 188 and the fourth contacting member 190 are constituted of a resin material such as polypropylene. As shown in FIG. 2, when the working machine 2 is placed on the placement surface P, only the first contacting member 184, the second contacting member 186, the third contacting member 188, and the fourth contacting member 190 come into contact with the placement surface P.

As shown in FIG. 16, the top frame 176 is fixed to the first right-side frame 170*a* and the first left-side frame 172*a* by screws. The top frame 176 extends rearward from the rear end of the first right-side frame 170*a*, thereafter bends leftward, and further bends and extends forward to the rear end of the first left-side frame 172*a*.

The lower frame 178 is coupled to the third right-side frame 170*c* and the third left-side frame 172*c*. The lower frame 178 is disposed between the third right-side frame 170*c* and the third left-side frame 172*c*. The lower frame 178 is disposed frontward of the rear frame 174. The lower frame 178 extends in the left-right direction.

The first fixing frame 180 is coupled to the second right-side frame 170*b* and the second left-side frame 172*b*. The first fixing frame 180 extends in the left-right direction. The second fixing frame 182 is coupled to the second right-side frame 170*b* and the second left-side frame 172*b* at a position lower than the first fixing frame 180. The second fixing frame 182 extends in the left-right direction.

As shown in FIG. 17, the facing surface 30 of the body housing 16 has a first fixing groove 192 and a second fixing groove 194 defined therein. The first fixing groove 192 and the second fixing groove 194 are recessed rearward from the facing surface 30. The first fixing groove 192 extends in the left-right direction in the vicinity of the upper end of the facing surface 30. The second fixing groove 194 extends in the left-right direction in the vicinity of the lower end of the facing surface 30. As shown in FIG. 18, the first fixing frame 180 is received in the first fixing groove 192 and is fixed to the body housing 16 by screws. An upper surface of the first fixing frame 180 abuts the upper surface of the first fixing groove 192 of the body housing 16. Further, when the first fixing frame 180 is received in the first fixing groove 192, the entirety of the first fixing frame 180 in the front-rear direction is disposed rearward of the facing surface 30. The second fixing frame 182 is received in the second fixing groove 194 and is fixed to the body housing 16 by screws. An upper surface of the second fixing frame 182 abuts the upper surface of the second fixing groove 194 of the body housing 16. Further, when the second fixing frame 182 is received in the second fixing groove 194, the entirety of the second fixing frame 182 in the front-rear direction is disposed rearward of the facing surface 30. Due to this, when the user wears the working machine 2 on his/her back, the first fixing frame 180 and the second fixing frame 182 can be suppressed from contacting the user's back.

Further, as shown in FIGS. 11, 13, and 18, a receiving groove 196 is defined in the lower portion of the tank body 90. The receiving groove 196 extends rearward from a front portion of the right end of the tank body 90, bends and extends from the right end to the left end of the tank body 90, further bends and extends forward to a front portion of the left end of the tank body 90. The first right-side frame 170*a*, the first left-side frame 172*a*, and the top frame 176 are received in the receiving groove 196 and support the upper portion of the tank body 90 from below.

A positional relationship of the body unit 4 and the frame unit 6 when the frame unit 6 is fixed to the body unit 4 will be described. As shown in FIG. 19, in the left-right direction, the second right-side frame 170*b* is disposed to the right (outward) of the body housing 16. The second left-side frame 172*b* is disposed to the left (outward) of the body housing 16. That is, the body housing 16 is disposed between the second right-side frame 170*b* and the second left-side frame 172*b*. Due to this, the battery unit 22 (see FIG. 3), the fan unit 18 (see FIG. 3), for example the battery packs BP (see FIG. 3) and the electric motor 46 (see FIG. 7), are disposed between the second right-side frame 170*b* and the second left-side frame 172*b*.

In the up-down direction, the top frame 176 is disposed above (outward of) the body housing 16. The rear frame 174 is disposed below (outward of) the body housing 16. That is, the body housing 16 is disposed between the top frame 176 and the rear frame 174. Due to this, the battery unit 22 and the fan unit 18, for example the battery packs BP and the electric motor 46, are disposed also between the top frame 176 and the rear frame 174.

As shown in FIG. 5, in the front-rear direction, the rear frame 174 is disposed rearward (outward) of the body housing 16. Due to this, the rear frame 174 is disposed rearward of the battery unit 22 and the fan unit 18, for example the battery packs BP and the electric motor 46.

As shown in FIG. 20, the lower frame 178 is disposed below (outward of) the body housing 16. The lower frame 178 faces a lower facing surface 200 of the body housing 16. The lower facing surface 200 constitutes a lower surface of the body housing 16. The lower facing surface 200 has a curved shape protruding downward toward the lower frame 178. In the left-right direction, the center point of the lower facing surface 200 is disposed closest to the lower frame 178, and opposite end points of the lower facing surface 200 are disposed farthest away from the lower frame 178.

When the working machine 2 is dropped and collides with the placement surface P at its lower end side, at least one of the contacting members 184, 186, 188, 190 collides with the placement surface P first. Due to this, the third right-side frame 170*c* (see FIG. 16) and/or the third left-side frame 172*c* (see FIG. 16) and/or the rear frame 174 (see FIG. 16) elastically deform before the body housing 16 collides with the placement surface P. After this, the lower frame 178 comes into contact with the lower facing surface 200, and the lower frame 178 elastically deforms, conforming to the shape of the lower facing surface 200. Due to this, impact caused by the fall is absorbed by the lower frame 178, and the body housing 16 is suppressed from being damaged.

As shown in FIG. 18, the harness unit 8 is attached to the body unit 4. The harness unit 8 comprises pads 204, a waist belt 206, and a shoulder harness unit 208. The pads 204 are fixed to the facing surface 30 of the body housing 16. The pads 204 are arranged at positions facing the first fixing groove 192 of the body housing 16. The pads 204 come into contact with the user's back when the user wears the working machine 2 on his/her back. The waist belt 206 is disposed below the pads 204. The waist belt 206 is disposed at a position facing the second fixing groove 194 of the body housing 16. The waist belt 206 are worn on the user's waist when the user wears the working machine 2 on his/her back.

The shoulder harness unit 208 comprises a right shoulder harness 210 to be worn on the user's right shoulder and a left shoulder harness 212 to be worn on the user's left shoulder. A first upper attaching part 214 is disposed on the facing surface 90*a* of the tank body 90, and the right shoulder harness 210 is attached to the first upper attaching part 214. The right shoulder harness 210 is directly attached to the tank body 90. A first lower attaching part 216 is disposed at the right end of the second fixing frame 182, and the right shoulder harness 210 is attached also to the first lower attaching part 216. The first lower attaching part 216 is disposed lower than the first upper attaching part 214. The right shoulder harness 210 is attached to the body housing 16 via the second fixing frame 182.

A second upper attaching part 218 is disposed on the facing surface 90*a* of the tank body 90, and the left shoulder harness 212 is attached to the second upper attaching part 218. The left shoulder harness 212 is directly attached to the tank body 90. A second lower attaching part 220 is disposed at the left end of the second fixing frame 182, and the left shoulder harness 212 is attached also to the second lower attaching part 220. The second lower attaching part 220 is disposed lower than the second upper attaching part 218. The left shoulder harness 212 is attached to the body housing 16 via the second fixing frame 182.

As shown in FIG. 21, in the left-right direction, a center position CP3 between the first upper attaching part 214 and the second upper attaching part 218 is disposed on the ejection tube 10 side (rightward) relative to the center position CP2 of the body unit 4. The center position CP3 is positioned at the center between the geometric center of the first upper attaching part 214 and the geometric center of the second upper attaching part 218. That is, a distance in the left-right direction from the center position CP3 to the left end of the first upper attaching part 214 is substantially the same as a distance in the left-right direction from the center position CP3 to the right end of the second upper attaching part 218. In FIG. 21, the center position CP2 is indicated by a broken line and the center position CP3 is indicated by a one-dot chain line. In the left-right direction, the center position CP2 is disposed between the first upper attaching part 214 and the second upper attaching part 218. When the two battery packs BP (see FIG. 3) are disposed in the second internal space 38 (see FIG. 3) and the liquid is stored at the maximum capacity in the liquid tank 24, the gravity center position of the body unit 4 is at the gravity center position G6, and the gravity center position of the working machine 2 is at a first total gravity center position G8. Further, when the two battery packs BP are disposed in the second internal space 38 and no liquid is stored in the liquid tank 24, the gravity center position of the body unit 4 is at the gravity center position G7, and the gravity center position of the working machine 2 is at a second total gravity center position G9. In the left-right direction, the gravity center positions G6, G7, the first total gravity center position G8, and the second total gravity center position G9 are between the first upper attaching part 214 and the second upper attaching part 218. The gravity center positions G6, G7, the first total gravity center position G8, and the second total gravity center position G9 are on the ejection tube 10 side (rightward) relative to the center position CP2. The gravity center position G6 and the first total gravity center position G8 are on the side opposite the ejection tube 10 (leftward) relative to the center position CP3. The first total gravity center position G8 is on the center position CP3 side relative to the gravity center position G6. The gravity center position G7 and the second total gravity center position G9 are on the ejection tube 10 side (rightward) relative to the center position CP3. The second total gravity center position G9 is apart from the center position CP3 than the gravity center position G7 is. In the left-right direction, the center position CP3 is substantially at the center between the first total gravity center position G8 and the second total gravity center position G9. That is, a distance in the left-right direction from the center position CP3 to the first total gravity center position G8 is substantially the same as a distance in the left-right direction from the center position CP3 to the second total gravity center position G9.

Next, the supply line 113 will be described. As shown in FIGS. 8 and 11, the supply line 113 comprises a first supply tube 230, a first supply cock 232, an electromagnetic valve 234, a supply tube 236, a second supply cock 238, a second supply tube 240, and a third supply cock 242. When the working machine 2 is used to work, the first supply cock 232, the second supply cock 238, and the third supply cock 242 are open. As shown in FIG. 11, the first supply tube 230 is coupled to the supplying portion 90*c* of the tank body 90. The first supply tube 230 is constituted of a metal material. The first supply cock 232 and the electromagnetic valve 234 is disposed on the first supply tube 230. The first supply cock 232 is operated by the user's hand. The first supply cock 232 is configured to open and close the first supply tube 230. Although not shown, the electromagnetic valve 234 is disposed inside the body housing 16 (see FIG. 3). The electromagnetic valve 234 is electrically connected to the control board 56 (see FIG. 7). The electromagnetic valve 234 opens and closes by being controlled by the control board 56.

The supply tube 236 is coupled to the first supply tube 230. The supply tube 236 is constituted for example of a resin material. As shown in FIG. 8, the supply tube 236 extends along the ejection tube 10. The second supply cock 238 is disposed on the supply tube 236. The supply tube 236 is fixed to the ejection tube 10 at a position where the second supply cock 238 is disposed. The second supply cock 238 is operated by the user's hand. The second supply cock 238 is configured to open and close the supply tube 236.

As shown in FIG. 22, the second supply tube 240 is coupled to the supply tube 236. The second supply tube 240 is constituted for example of a resin material. The distal end tube 66 comprises a first distal end tube 67 and a second distal end tube 68 attached to the front end of the first distal end tube 67, and the second supply tube 240 is integrated with the first distal end tube 67. The second supply tube 240 comprises an outer portion 244, a first inner portion 246, and a second inner portion 248. The outer portion 244 is disposed outside the distal end tube 66. The third supply cock 242 is disposed on the outer portion 244. The third supply cock 242 is operated by the user's hand. The third supply cock 242 is configured to open and close the outer portion 244. The first inner portion 246 and the second inner portion 248 are disposed inside the distal end tube 66. The first inner portion 246 extends downward from the lower end of the outer portion 244. The second inner portion 248 extends toward an ejection opening 68*a* of the second distal end tube 68 from the lower end of the first inner portion 246. When the first supply cock 232 (see FIG. 11), the electromagnetic valve 234 (see FIG. 11), the second supply cock 238 (see FIG. 8), and the third supply cock 242 are open, the liquid in the liquid tank 24 (see FIG. 8) can flow in the first supply tube 230 (see FIG. 8), the supply tube 236, and the second supply tube 240.

Hereinbelow, the case in which the longitudinal direction of the distal end tube 66 extends along the front-rear direction will be described as an example. The working machine 2 further comprises a tubular member 250 and a liquid nozzle 252. The tubular member 250 is disposed inside the second distal end tube 68. The tubular member 250 has a substantially cylindrical shape having its longitudinal direction in the front-rear direction. The tubular member 250 comprises a front cylinder portion 250*a* and a rear cylinder portion 250*b*. The front cylinder portion 250*a* is coupled to the second distal end tube 68 via a plurality of fins 254. The front cylinder portion 250*a*, the plurality of fins 254, and the second distal end tube 68 are integrally formed. The rear cylinder portion 250*b* is disposed rearward of the front cylinder portion 250*a*. The rear cylinder portion 250*b* is coupled to the fins 254 and the second distal end tube 68 by screws. A diameter of the inner surface of the tubular member 250 decreases from the rear end toward the front end, and thereafter increases. A part of the air flowing inside the distal end tube 66 flows inside the tubular member 250 as in an arrow F1 shown in FIG. 22, and a remainder of the air flowing inside the distal end tube 66 flows outside the tubular member 250 as in an arrow F2 shown in FIG. 22.

The liquid nozzle 252 is a high concentration, ultra-low volume (ULV) nozzle, for example. The liquid nozzle 252 is disposed inside the second distal end tube 68. The front end of the liquid nozzle 252 is at a position closest to the ejection opening 68*a* of the second distal end tube 68 (on the frontmost side), and the rear end of the liquid nozzle 252 is disposed at a position farthest away from the ejection opening 68*a* of the second distal end tube 68 (on the rearmost side). The front end of the liquid nozzle 252 corresponds to the distal end of the liquid nozzle 252 and the rear end of the liquid nozzle 252 corresponds to the base end of the liquid nozzle 252. The liquid nozzle 252 has its longitudinal direction in the front-rear direction. The liquid nozzle 252 is constituted of a metal material such as brass. In a variant, the liquid nozzle 252 may be constituted of a resin material. As shown in FIG. 23, the liquid nozzle 252 comprises an insertion part 256 and a nozzle part 258. The insertion part 256 has a substantially cylindrical shape. As shown in FIG. 24, an elastic member 262 is attached to the outer surface of the insertion part 256. The elastic member 262 is for example an O-ring. Further, an outer thread part 264 is defined in the outer surface of the insertion part 256. An inner thread part 248*a* is defined in an inner surface of the second inner portion 248. The insertion part 256 is coupled to the second inner portion 248 by inserting the insertion part 256 in the inner surface of the second inner portion 248 and screw-fastening the outer thread part 264 of the insertion part 256 with the inner thread part 248*a* of the second inner portion 248. When the insertion part 256 is coupled to the second inner portion 248, the elastic member 262 is interposed between the outer surface of the insertion part 256 and the inner surface of the second inner portion 248. Due to this, a space between the outer surface of the insertion part 256 and the inner surface of the second inner portion 248 is sealed.

The nozzle part 258 is coupled to the front end of the insertion part 256. The nozzle part 258 comprises a side surface 266. The side surface 266 forms at least a part of an outer shape of the nozzle part 258. Apart of the air flowing inside the distal end tube 66 (see FIG. 22) flows toward the front end (distal end) of the liquid nozzle 252 along the side surface 266 as shown by the arrow F1. The side surface 266 comprises a first side surface 268 and a second side surface 270. A diameter of the rear end of the first side surface 268 is substantially the same as a diameter of the outer surface of the second inner portion 248. The diameter of the first side surface 268 decreases from the rear end toward the front end of the nozzle part 258. The first side surface 268 has a smooth curved shape. The second side surface 270 is disposed frontward of the first side surface 268. A diameter of the second side surface 270 is equal to the diameter of the front end of the first side surface 268, and is constant along the front-rear direction. As shown in FIG. 22, at least a part of the first side surface 268 and the second side surface 270 are surrounded by the rear cylinder portion 250*b*.

As shown in FIG. 24, the liquid nozzle 252 further comprises a liquid passage 274. The liquid passage 274 is disposed inside the insertion part 256 and the nozzle part 258. The liquid passage 274 extends from the rear end (base end) to the front end (distal end) of the liquid nozzle 252. The liquid passage 274 is disposed on a center axis CX of the liquid nozzle 252. In FIGS. 24 and 25, the center axis CX is indicated by a broken line. The center axis CX extends in the front-rear direction (in the longitudinal direction of the liquid nozzle 252). The liquid passage 274 comprises a main passage 276, a transitional passage 278, and a narrow passage 280. A diameter of the main passage 276 is for example 5 mm. The main passage 276 extends forward from the rear end of the insertion part 256. The main passage 276 is defined both in the insertion part 256 and the nozzle part 258. As shown in FIG. 25, the transitional passage 278 is connected to the main passage 276. A diameter of the transitional passage 278 gradually decreases toward the front side. A diameter of the narrow passage 280 is smaller than the diameter of the main passage 276. The diameter of the narrow passage 280 is for example 0.5 mm. The narrow passage 280 extends from the front end of the transitional passage 278 to the end surface 282 of the nozzle part 258.

The end surface 282 of the nozzle part 258 corresponds to the end surface of the liquid nozzle 252. The end surface 282 comprises an inclined surface 284 and a non-inclined surface 286. An ejection opening 280*a* of the narrow passage 280 is defined in the inclined surface 284. The ejection opening 280*a* is at the center of the inclined surface 284. The center of the inclined surface 284 is on the center axis CX. When a plane perpendicularly intersecting the center axis CX is assumed as a virtual plane VP1, the inclined surface 284 is inclined relative to the virtual plane VP1. In FIG. 25, the virtual plane VP1 is indicated by a one-dot chain line. An inclination angle of the inclined surface 284 relative to the virtual plane VP1 is for example 5 degrees or more, and in the present embodiment, it is 20 degrees. The front end of the inclined surface 284 is disposed frontward of the rear end of the inclined surface 284 (closer to the distal end of the liquid nozzle 252). The front end of the inclined surface 284 is separated away from the center axis CX than the rear end of the inclined surface 284 is. That is, the inclined surface 284 separates away from the center axis CX as the inclined surface 284 is closer to the front side (to the distal end of the liquid nozzle 252).

The non-inclined surface 286 is disposed over an entire periphery of the inclined surface 284. The non-inclined surface 286 is disposed frontward of the inclined surface 284. The non-inclined surface 286 is separated away from the center axis CX than the inclined surface 284 is. The non-inclined surface 286 is substantially parallel to the virtual plane VP1. The non-inclined surface 286 is inclined relative to the inclined surface 284. Further, the non-inclined surface 286 is at a substantially right angle relative to the second side surface 270.

The liquid nozzle 252 further comprises a corner part 290. The corner part 290 is separated away from the center axis CX than the non-inclined surface 286 is from the center axis CX. As shown in FIG. 26, the corner part 290 connects the second side surface 270 with the non-inclined surface 286. FIG. 26 is a cross-sectional view enlarging the corner part 290 of the liquid nozzle 252, and depicts the corner part 290 with emphasis. The corner part 290 is disposed over an entire periphery of the non-inclined surface 286. The corner part 290 constitutes a corner of the front end (distal end) of the liquid nozzle 252. A curvature radius of the corner part 290 is for example 0.3 mm or less. The corner part 290 is a pointed corner (sharp corner). The corner part 290 may be pointed with an acute angle or with an obtuse angle. The corner part 290 has a curved surface shape. In a variant, the corner part 290 may have a planar shape. The corner part 290 connects with the second side surface 270 at a side surface connecting point 292, and is connected to the non-inclined surface 286 at a distal end connecting point 294. A virtual side surface 296 defined by extending the second side surface 270 and a virtual end surface 298 defined by extending the non-inclined surface 286 intersect substantially at a right angle at a first point 300 in the vicinity of the corner part 290. A distance L1 between the first point 300 and the side surface connecting point 292 is for example 0.3 mm or less. Further, a distance L2 between the first point 300 and the distal end connecting point 294 is for example 0.3 mm or less. The distance L2 is substantially the same as the distance L1. In a variant, the distance L2 may be different from the distance L1.

Next, a manufacturing method of the liquid nozzle 252 will be described. The manufacturing method comprises an insertion part cutting step, an end surface cutting step, a side surface cutting step, and a liquid passage forming step. As shown in FIG. 24, in the insertion part cutting step, a cutter blade is moved from the rear end (base end) toward the front end (distal end) of the liquid nozzle 252 to form the insertion part 256 on the liquid nozzle 252. Further, the cutter blade is moved spirally along a circumferential direction of the outer surface of the insertion part 256 and the outer thread part 264 is formed on the insertion part 256. Next, as shown in FIG. 26, in the end surface cutting step, the cutter blade is moved on the front end (distal end) of the liquid nozzle 252 in a direction separating away from the center axis CX (in a first direction D1 of FIG. 26) starting from the center axis CX to form the end surface 282 on the liquid nozzle 252. Then, in the side surface cutting step, the cutter blade is moved from the insertion part 256 toward the end surface 282 (in a second direction D2 of FIG. 26) on the lateral side of the liquid nozzle 252 to form the side surface 266 on the liquid nozzle 252. Due to this, the pointed corner part 290 is formed at the front end (distal end) of the liquid nozzle 252. In this process, fine protrusions (burr) that are not shown are formed on the corner part 290, and these protrusions are on the center axis CX side relative to the second side surface 270 and extend frontward. That is, the protrusions do not protrude in the direction separating away from the center axis CX relative to the second side surface 270. Finally, as shown in FIG. 24, in the liquid passage forming step, a hole driller is inserted in the liquid nozzle 252 and the liquid passage 274 is formed in the liquid nozzle 252.

Next, an operation by which the liquid ejected from the liquid nozzle 252 is atomized will be described. Firstly, as shown in FIG. 22, when the fan 44 (see FIG. 7) rotates by the rotation of the electric motor 46 (see FIG. 7), air flows in the ejection tube 10. The air flows in the ejection tube 10 to the distal end tube 66, then enters inside the tubular member 250 as in the arrow F1 shown in FIG. 22, and flows along the side surface 266 of the liquid nozzle 252 toward the front end (distal end) of the liquid nozzle 252. Further, since the first side surface 268 of the liquid nozzle 252 is surrounded by the tubular member 250 and the diameter of the first side surface 268 becomes smaller as the first side surface 268 is closer to the front end of the nozzle part 258 from the rear end, the air easily flows into the tubular member 250 and the space in which the air flows (space around the first side surface 268) becomes narrower, by which the speed of the air is increased. The air that flowed along the side surface 266 passes the liquid nozzle 252, and further flows in the tubular member 250 from the rear end toward the front end of the tubular member 250. As shown in FIG. 25, accompanying this airflow, a pressure difference occurs between a region in the vicinity of the side surface 266 and a front region of the end surface 282 of the liquid nozzle 252, as a result of which an airflow (swirling flow) SW1 shown in FIG. 25 is generated in the front region of the end surface 282 of the liquid nozzle 252. The airflow SW1 firstly flows toward the end surface 282 of the liquid nozzle 252 along the center axis CX. Then, the airflow SW1 turns in the direction separating away from the center axis CX and flows on the end surface 282 toward the corner part 290 over the inclined surface 284 and then over the non-inclined surface 286. Finally, the airflow SW1 merges with the flow of the air flowing along the side surface 266 in the vicinity of the corner part 290.

By the airflow SW1 flowing toward the corner part 290 on the end surface 282, the liquid ejected from the ejection opening 280*a* of the narrow passage 280 to the outside of the liquid nozzle 252 flows on the end surface 282 toward the corner part 290 over the inclined surface 284 and then over the non-inclined surface 286. This generation of the airflow SW1 allows the liquid to be ejected out of the liquid nozzle 252 from the ejection opening 280*a* without using an actuation source such as a pump.

The liquid that flowed to the corner part 290 moves toward the side surface 266. Since the corner part 290 is a pointed corner, the liquid tends not to form a liquid pool on the corner part 290, and moves smoothly from the corner part 290 to the side surface 266. Due to this, the liquid is atomized when the liquid collides with the air flowing along the side surface 266. The liquid is atomized such that its diameter becomes 50 micrometers or less, for example. By the configuration of the liquid nozzle 252 of the present embodiment, the (electric) working machine 2 that is driven by the electric motor 46 can atomize the liquid although an air volume of the fan 44 is smaller than that of a working machine driven by an engine.

As shown in FIG. 22, the atomized liquid flows in the distal end tube 66 together with the air flowing in the tubular member 250 indicated by the arrow F1. After this, the liquid and the air flowing in the tubular member 250 merges with the air flowing outside the tubular member 250 as indicated by the arrow F2, and is ejected (sprayed) to the outside of the second distal end tube 68 from the spray cover 70.

Effects

The working machine 2 of the present embodiment is a backpack working machine configure to be worn on the user's back. The working machine 2 is configured to eject the liquid. The working machine 2 comprises the body unit 4 and the shoulder harness unit 208 attached to the body unit 4 and configured to be worn on the shoulders of the user. The body unit 4 comprises the battery unit 22 comprising the battery attaching parts 84, 86 to which battery packs BP (examples of battery) are attached, the fan unit 18 comprising the fan 44 configured to operate on the electrical power of the battery packs BP, and the liquid tank 24 configured to store the liquid. When the backpack working machine 2 is placed on the placement surface P, the direction perpendicular to the placement surface P is defined as the up-down direction. When the backpack working machine 2 placed on the placement surface P is viewed from above, 50% or more of the battery unit 22, 50% or more of the fan unit 18, and 50% or more of the liquid tank 24 overlap each other.

According to the above configuration, even when the amount of the liquid stored in the liquid tank 24 decreases as the backpack working machine 2 is used to work, the gravity center position of the body unit 4 tends not to move in the direction separating away from the user's back wearing the backpack working machine 2. Due to this, the working machine 2 can be suppressed from becoming difficult to use for the user.

Further, the battery unit 22 is disposed above the fan unit 18. The liquid tank 24 is disposed above the battery unit 22.

According to the above configuration, since the liquid tank 24 is disposed above the fan unit 18 and the battery unit 22, the liquid can easily be supplied to the liquid tank 24. Further, since the fan unit 18 is disposed below the battery unit 22 and the liquid tank 24, the ejection tube 10 in which the air delivered by the fan 44 flows can be disposed at a lower position as compared to the case in which the fan unit 18 is not disposed below the battery unit 22 or the liquid tank 24. Due to this, for example, the ejection tube 10 can be suppressed from coming into contact with the user's body around the ribs during work. According to the above configuration, the liquid can more efficiently be supplied to the liquid tank 24, and the working machine 2 can be suppressed from becoming difficult to use for the user when the user wears the backpack working machine 2 on his/her back.

Further, the body unit 4 further comprises the facing surface 4*a* that faces the user's back when the shoulder harness unit 208 is worn on the shoulders of the user. With respect to the front-rear direction perpendicular to the facing surface 4*a*, the gravity center position G2 of the battery unit 22, the gravity center position G1 of the fan unit 18, and the gravity center position G3 of the liquid tank 24 are disposed in the region of the body unit 4, the region having the width that is one-third (⅓) of the width of the body unit 4 in the front-rear direction.

According to the above configuration, even when the amount of the liquid stored in the liquid tank 24 decreases as the backpack working machine 2 is used to work, the gravity center position of the body unit 4 tends not to move in the direction separating away from the user's back wearing the backpack working machine 2. Due to this, the working machine 2 can further be suppressed from becoming difficult to use for the user.

Further, the gravity center position of the body unit 4 is on the facing surface 4*a* side relative to the center position of the body unit 4 in the front-rear direction.

According to the above configuration, a force acting in the direction separating away from the user's back tends not to be applied to the body unit 4 when the user wears the backpack working machine 2 on his/her back. Due to this, the working machine 2 can be suppressed from becoming difficult to use for the user.

Further, the shoulder harness unit 208 comprises the right shoulder harness 210 attached to the body unit 4 at the first upper attaching part 214 (an example of first attaching part) and configured to be worn on the right shoulder of the user and the left shoulder harness 212 attached to the body unit 4 at the second upper attaching part 218 (an example of second attaching part) and configured to be worn on the left shoulder of the user. With respect to the left-right direction perpendicular to the up-down direction and the front-rear direction, the gravity center position of the body unit 4 may be between the first upper attaching part 214 and the second upper attaching part 218.

According to the above configuration, when the user wears the backpack working machine 2 on his/her back, imbalance in the backpack working machine 2 in the left-right direction can further be suppressed. Due to this, the working machine 2 can further be suppressed from becoming difficult to use for the user.

Further, with regard to the left-right direction perpendicular to the up-down direction and the front-rear direction, the gravity center position G2 of the battery unit 22, the gravity center position G1 of the fan unit 18, and the gravity center position G3 of the liquid tank 24 are disposed in the region having the width that is one-third (⅓) of the width of the body unit 4 in the left-right direction.

According to the above configuration, even when the amount of the liquid stored in the liquid tank 24 decreases as the backpack working machine 2 is used to work, the gravity center position of the body unit 4 tends not to move in the left-right direction. Due to this, the working machine 2 can further be suppressed from becoming difficult to use for the user.

(Variants)

The working machine 2 according to an embodiment may be a working machine driven by an engine.

The working machine 2 according to an embodiment is not limited to the mist blower, but may be an atomizer or a high-pressure washer.

The working machine 2 according to an embodiment may be a working machine with an internal battery. In this case, the internal battery is configured to be charged by connecting a power cable to an external power source.

The battery unit 22 according to an embodiment may comprise only one battery pack BP.

The working machine 2 according to an embodiment is not limited to the backpack working machine, but may for example be a stationery working machine or a handheld working machine.

The check valve 144 according to an embodiment is not limited to the umbrella valve, and may for example be a duckbill valve.

The liquid tank 24 according to an embodiment may not comprise the filter unit 94.

In the liquid tank 24 according to an embodiment, the sidewall 114 may not comprise the second side portion 122. In this case, the plurality of communication holes 126 may be disposed on the first side portion 120 at portion(s) where the engagement receiving rail 124 is partially discontinued.

The shoulder harness unit 208 according to an embodiment may not be attached to the liquid tank 24. In this case, the shoulder harness unit 208 is attached only to the body housing 16.

In the working machine 2 according to an embodiment, arrangement of the fan unit 18, the battery unit 22, and the liquid tank 24 in the up-down direction is not limited to the configuration in the embodiment. For example, the fan unit 18 may be disposed above the battery unit 22 and the liquid tank 24 may be disposed above the fan unit 18.

As shown in FIG. 27, the liquid nozzle 252 according to an embodiment may have a plurality of ejection openings 280*a* defined in the end surface 282. The plurality of ejection openings 280*a* may for example be disposed about the center axis CX.

As shown in FIG. 28, in the liquid nozzle 252 according to an embodiment, the end surface 282 may further comprise a central non-inclined surface 310. The central non-inclined surface 310 is substantially parallel to the virtual plane VP1. The ejection opening 280*a* of the narrow passage 280 is defined in the central non-inclined surface 310. The inclined surface 284 is connected to the periphery of the central non-inclined surface 310.

In the liquid nozzle 252 according to an embodiment, the end surface 282 may not comprise the non-inclined surface 286. In this case, the inclined surface 284 is connected to the corner part 290.

In the liquid nozzle 252 according to an embodiment, the corner part 290 may be disposed only in a part of the periphery of the end surface 282 in the circumferential direction.

What is claimed is:

1. A backpack working machine configured to eject liquid, the backpack working machine comprising:
- a body unit; and
- a shoulder harness unit attached to the body unit and configured to be worn on shoulders of a user,
- wherein
- the body unit comprises:
  - a battery unit comprising a battery attaching part to which a battery is attached;
  - a fan unit comprising a fan configured to operate on electrical power of the battery;
  - a liquid tank configured to store the liquid; and
  - a control unit comprising a control board configured to control rotation of the fan,
- when the backpack working machine is placed on a placement surface, a direction perpendicular to the placement surface is defined as an up-down direction,
- when the backpack working machine placed on the placement surface is viewed from above, an entirety of the battery unit and an entirety of the fan unit overlap the liquid tank,
- when the backpack working machine placed on the placement surface is viewed from above, 50% or more of the battery unit overlaps the fan unit and 50% or more of the fan unit overlaps the battery unit,
- the battery unit is disposed above the fan unit,
- the liquid tank is disposed above the battery unit, and
- the control unit is disposed above the fan unit,
- the fan unit comprises a tubular member which houses the fan and inside which air delivered flowed by the fan flows,
- an opening is defined in an upper portion of the tubular member, and
- the control unit closes the opening of the tubular member.

2. The backpack working machine according to claim 1, wherein
- the body unit further comprises a facing surface that faces a back of the user when the shoulder harness unit is worn on the shoulders of the user, and
- with respect to a front-rear direction perpendicular to the facing surface, a gravity center position of the battery unit, a gravity center position of the fan unit, and a gravity center position of the liquid tank are disposed in a region of the body unit, the region having a width that is one-third of a width of the body unit in the front-rear direction.

3. The backpack working machine according to claim 2, wherein a gravity center position of the body unit is on a facing surface side relative to a center position of the body unit in the front-rear direction.

4. The backpack working machine according to claim 2, wherein the shoulder harness unit comprises:

a right shoulder harness attached to the body unit at a first attaching part and configured to be worn on a right shoulder of the user; and a left shoulder harness attached to the body unit at a second attaching part and configured to be worn on a left shoulder of the user, and with respect to a left-right direction perpendicular to the up-down direction and the front-rear direction, a gravity center position of the body unit is between the first attaching part and the second attaching part.

5. The backpack working machine according to claim 2, wherein with regard to a left-right direction perpendicular to the up-down direction and the front-rear direction, the gravity center position of the battery unit, the gravity center position of the fan unit, and the gravity center position of the liquid tank are disposed in a region of the body unit, the region having a width that is one-third of a width of the body unit in the left-right direction.

6. The backpack working machine according to claim 1, wherein the body unit comprises a facing surface that faces a back of the user when the shoulder harness unit is worn on the shoulders of the user, with respect to a front-rear direction perpendicular to the facing surface, a gravity center position of the battery unit, a gravity center position of the fan unit, and a gravity center position of the liquid tank are disposed in a region of the body unit, the region having a width that is one-third of a width of the body unit in the front-rear direction, a gravity center position of the body unit is on a facing surface side relative to a center position of the body unit in the front-rear direction, the shoulder harness unit comprises:

a right shoulder harness attached to the body unit at a first attaching part and configured to be worn on a right shoulder of the user; and a left shoulder harness attached to the body unit at a second attaching part and configured to be worn on a left shoulder of the user, with respect to a left-right direction perpendicular to the up-down direction and the front-rear direction, a gravity center position of the body unit is between the first attaching part and the second attaching part, and with regard to the left-right direction, the gravity center position of the battery unit, the gravity center position of the fan unit, and the gravity center position of the liquid tank are disposed in a region of the body unit, the region having a width that is one-third of a width of the body unit in the left-right direction.

7. The backpack working machine according to claim 1, wherein the battery unit is disposed above the control unit.

* * * * *